United States Patent
Li et al.

(10) Patent No.: US 10,838,953 B1
(45) Date of Patent: *Nov. 17, 2020

(54) METHOD AND APPARATUS FOR FRAME BASED SEARCH

(71) Applicant: NetBase Solutions, Inc., Santa Clara, CA (US)

(72) Inventors: Wei Li, Cupertino, CA (US); Michael Jacob Osofsky, Palo Alto, CA (US); Lokesh Pooranmal Bajaj, Fremont, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,413

(22) Filed: Jun. 2, 2015

Related U.S. Application Data

(63) Continuation of application No. 12/177,122, filed on Jul. 21, 2008, now Pat. No. 9,047,285.

(51) Int. Cl.
*G06F 16/242* (2019.01)
*G06F 16/9535* (2019.01)
*G06F 16/2457* (2019.01)

(52) U.S. Cl.
CPC ...... *G06F 16/243* (2019.01); *G06F 16/24575* (2019.01); *G06F 16/9535* (2019.01)

(58) Field of Classification Search
CPC ......... G06F 17/30864; G06F 17/30867; G06F 17/2785; G06F 16/243; G06F 16/9535; G06F 16/24575
USPC ......... 707/706–708, 736, 758, 770; 704/4, 9
See application file for complete search history.

(56) References Cited

U.S. PATENT DOCUMENTS

| 5,175,814 A | * | 12/1992 | Anick ................. G06F 16/2428 715/835 |
| 5,694,523 A | | 12/1997 | Wical |
| 5,787,432 A | | 7/1998 | LeTourneau |
| 5,940,821 A | | 8/1999 | Wical |

(Continued)

OTHER PUBLICATIONS

Gautam et al., published Feb. 17, 2008 (y/m/d), pp. 2040-2042. "Document Retrieval Based on Key Information of Sentence," IEEE ICACT.

(Continued)

*Primary Examiner* — Shahid A Alam
(74) *Attorney, Agent, or Firm* — Kaplan IP Law, PLLC; Jonathan T. Kaplan

(57) ABSTRACT

A frame represents a concept with a set of roles and a set of linguistic rules. If a linguistic rule is satisfied, by a unit of natural language discourse (UNLD), the frame is invoked and a frame instance produced. A frame instance specifies how the UNLD, with particular values drawn from the UNLD, fulfills the roles of the frame. A frame-based search, of target content, is accomplished in response to a frame-based user query. The search result is comprised of records, where each record is a result of a match, of the frame-based query, at a location in the target content. If the frame-based query is implicit, a match requires only that the location of the target content invokes the appropriate frame. If the frame-based query is role-specific, in addition to invoking the appropriate frame, a query search term needs to be found in the value for a role of the frame instance produced.

9 Claims, 28 Drawing Sheets

(56) References Cited

U.S. PATENT DOCUMENTS

| | | | |
|---|---|---|---|
| 5,950,194 A * | 9/1999 | Bennett | H04L 65/602 704/251 |
| 5,963,940 A | 10/1999 | Liddy et al. | |
| 5,995,922 A | 11/1999 | Penteroudakis et al. | |
| 6,012,053 A * | 1/2000 | Pant et al. | |
| 6,202,064 B1 | 3/2001 | Julliard | |
| 6,269,356 B1 | 7/2001 | Hatton | |
| 6,278,967 B1 | 8/2001 | Akers et al. | |
| 6,292,796 B1 * | 9/2001 | Drucker | G06F 16/335 |
| 6,453,312 B1 | 9/2002 | Goiffon et al. | |
| 6,560,590 B1 | 5/2003 | Shwe et al. | |
| 6,571,240 B1 | 5/2003 | Ho | |
| 6,578,022 B1 | 6/2003 | Foulger et al. | |
| 6,584,464 B1 | 6/2003 | Warthen | |
| 6,671,723 B2 | 12/2003 | Nguyen et al. | |
| 6,675,159 B1 | 1/2004 | Lin et al. | |
| 6,738,765 B1 | 5/2004 | Wakefield et al. | |
| 6,862,713 B1 * | 3/2005 | Kraft et al. | 715/728 |
| 6,901,399 B1 * | 5/2005 | Corston | G06F 16/3344 704/9 |
| 6,965,857 B1 | 11/2005 | Decary | |
| 7,302,383 B2 | 11/2007 | Valles | |
| 7,305,336 B2 | 12/2007 | Polanyi et al. | |
| 7,356,540 B2 | 4/2008 | Smith et al. | |
| 7,496,593 B2 | 2/2009 | Gardner et al. | |
| 7,779,007 B2 * | 8/2010 | West et al. | 707/736 |
| 7,805,302 B2 | 9/2010 | Chelba et al. | |
| 8,046,348 B1 | 10/2011 | Rehling et al. | |
| 8,055,608 B1 | 11/2011 | Rehling et al. | |
| 8,131,540 B2 | 3/2012 | Marchisio et al. | |
| 2002/0065857 A1 | 5/2002 | Michalewicz et al. | |
| 2002/0091671 A1 | 7/2002 | Prokoph | |
| 2002/0193986 A1 * | 12/2002 | Schirris | 704/8 |
| 2003/0093421 A1 | 5/2003 | Kimbrough et al. | |
| 2003/0172061 A1 | 9/2003 | Krupin et al. | |
| 2003/0182102 A1 | 9/2003 | Corston-Oliver et al. | |
| 2003/0216905 A1 | 11/2003 | Chelba et al. | |
| 2004/0044952 A1 | 3/2004 | Jiang et al. | |
| 2004/0078190 A1 | 4/2004 | Fass et al. | |
| 2005/0149494 A1 | 7/2005 | Lindh et al. | |
| 2005/0165600 A1 | 7/2005 | Kasravi et al. | |
| 2006/0009966 A1 | 1/2006 | Johnson et al. | |
| 2006/0235689 A1 * | 10/2006 | Sugihara | G06F 16/3329 704/257 |
| 2007/0156677 A1 | 7/2007 | Szabo | |
| 2007/0174244 A1 * | 7/2007 | Jones | G06F 16/24578 |
| 2007/0239689 A1 * | 10/2007 | Bennett | G06F 16/3334 |
| 2007/0294784 A1 * | 12/2007 | West et al. | 800/278 |
| 2010/0318348 A1 | 12/2010 | Chelba et al. | |
| 2014/0236575 A1 * | 8/2014 | Tur | G06F 17/2785 704/9 |

OTHER PUBLICATIONS

Ku et al., published Mar. 27, 2006 (y-m-d), 8 pgs. "Opinion Extraction, Summarization and Tracking in News and Blog Corpora," AAAI Spring Symposium Series 2006.

Manning et al., published 1999. "Foundations of Statistical Natural Language Processing," The MIT Press, Table of Contents (12 pgs), sec. 8.5.1 (pp. 296-303) & sec. 15.2 (pp. 539-544). ISBN 0-262-13360-1.

Ruppenhofer et al., published Aug. 25, 2006 (y/m/d), 166 pages. "FrameNet II: Extended Theory and Practice," International Computer Science Institute, University of California at Berkeley, USA.

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

Zadrozny, Slawomir et al., published 2003, 5 pgs. "Linguistically quantified thresholding strategies for text categorization," Systems Research Institute, Polish Academy of Sciences, Warszawa, Poland.

* cited by examiner

FIGURE 1A

EXAMPLE BENEFIT FRAME EXTRACTION RULE
ROOT FEATURE IS LOGICAL VERB

1. IMPROVE_Rule

2. Root_node: IMPROVE --> [Benefit]
3.     Actor: HUMAN --> Benefactor
4.     Actor: NON-HUMAN --> Instrument 5.     Undergoer:BADTHING --> Problem
6.     Undergoer:NON-BADTHING --> Gain
7.         (Modifier: Prep(for|in)...HUMAN-->Beneficiary)

FIGURE 1B

EXAMPLE INPUT STATEMENT

"Weight loss usually improves sleep apnea in women."

FIGURE 1C

LOGICAL FORM FROM SEMANTIC PARSER

1. "improves"
2.     Actor: weight loss

3.     Undergoer: sleep apnea
4.         Modifier: in women

FIGURE 1D

BENEFIT FRAME INSTANCE

1. Instrument: weight loss
2. Problem: sleep apnea
3. Beneficiary: women
4. Benefit: improves sleep apnea in women

FIGURE 2A

EXAMPLE BENEFIT FRAME EXTRACTION RULE
ROOT FEATURE IS SURFACE ADJECTIVE

1. A_is_GOOD_for_Rule

2. Root_node: GOOD
3.     Actor: HUMAN --> Benefactor
4.     Actor: NON-HUMAN --> Instrument 5.     Complement: Prep(against|for) ...BADTHING --> Problem
6.     Complement: Prep(for|in|at) ... ACTION --> Benefit
7.     Complement: Prep(for) ... ABSTRACT_NOUN --> Gain
8.     Complement: Prep(for) ... HUMAN --> Beneficiary
9.         (Modifier: Prep(with|in)...BADTHING --> Problem)

FIGURE 2B

EXAMPLE INPUT STATEMENT

"Cisplatin is good for patients with metastatic breast cancer."

FIGURE 2C

LOGICAL FORM FROM SEMANTIC PARSER

1. "good"
2.     Actor: Cisplatin

3.     Complement: for patients
4.         Modifier: with metastatic breast cancer

FIGURE 2D

BENEFIT FRAME INSTANCE

1. Instrument: Cisplatin
2. Problem: metastatic breast cancer
3. Beneficiary: patients

FIGURE 3A

EXAMPLE BENEFIT FRAME EXTRACTION RULE
ROOT FEATURE IS SURFACE NOUN

1. GOODTHING_Cause_Rule

2. Root_node: GOODTHING --> Gain
3.     Cause: HUMAN --> Benefactor
4.     Cause: NON-HUMAN --> Instrument 5.     (Modifier: Prep(for|in)...HUMAN-->Beneficiary)

FIGURE 3B

EXAMPLE INPUT STATEMENT

"Exercise led to health for everyone."

FIGURE 3C

LOGICAL FORM FROM SEMANTIC PARSER

1. "health"
2.     Cause: exercise

3.     Modifier: for everyone

FIGURE 3D

BENEFIT FRAME INSTANCE

1. Instrument: exercise
2. Gain: health
3. Beneficiary: everyone

FIGURE 4A

EXAMPLE BENEFIT FRAME EXTRACTION RULE
ROOT LEXICAL IS SURFACE VERB

1.  A_benefit_from_B_Rule

2.  Root_node: benefit_from --> [Benefit]
3.      Actor: Noun --> Beneficiary
4.          (Modifier: Prep(with|in)...BADTHING --> Problem)

5.      Undergoer: Noun --> Instrument

FIGURE 4B

EXAMPLE INPUT STATEMENT

"Women with early stage breast cancer will benefit from the new drug xyz."

FIGURE 4C

LOGICAL FORM FROM SEMANTIC PARSER

1.  "will benefit from"
2.      Actor: women
3.          Modifier: with early stage breast cancer 4.      Undergoer: xyz
5.          Modifier: the new drug

FIGURE 4D

BENEFIT FRAME INSTANCE

1.  Instrument: xyz
2.  Problem: early stage breast cancer
3.  Beneficiary: women
4.  Benefit: will benefit from the new drug xyz

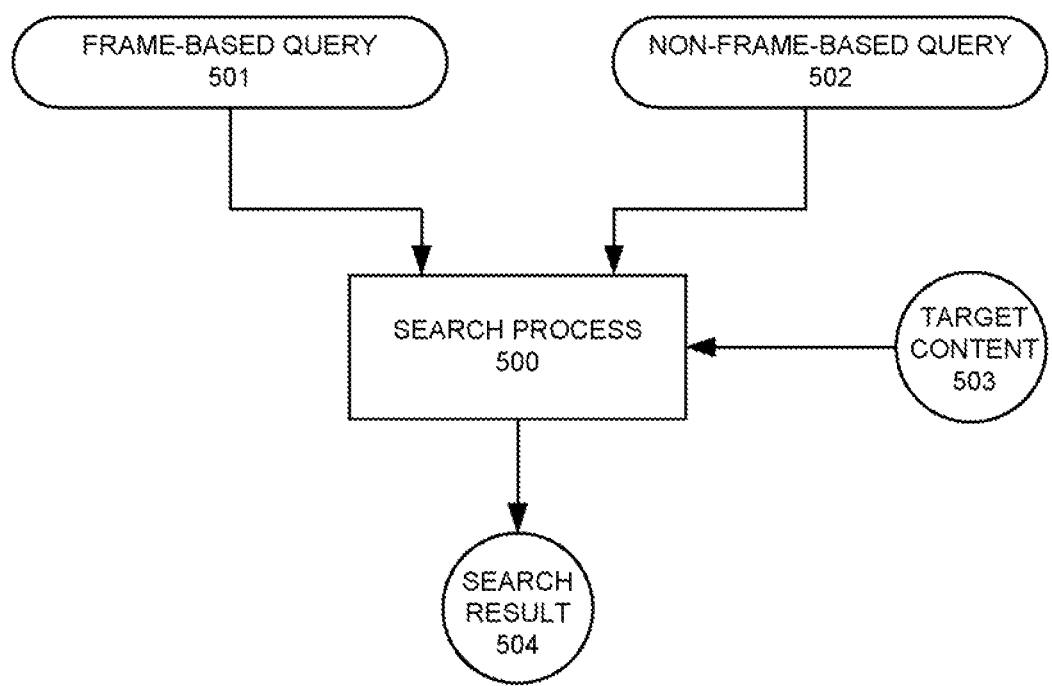

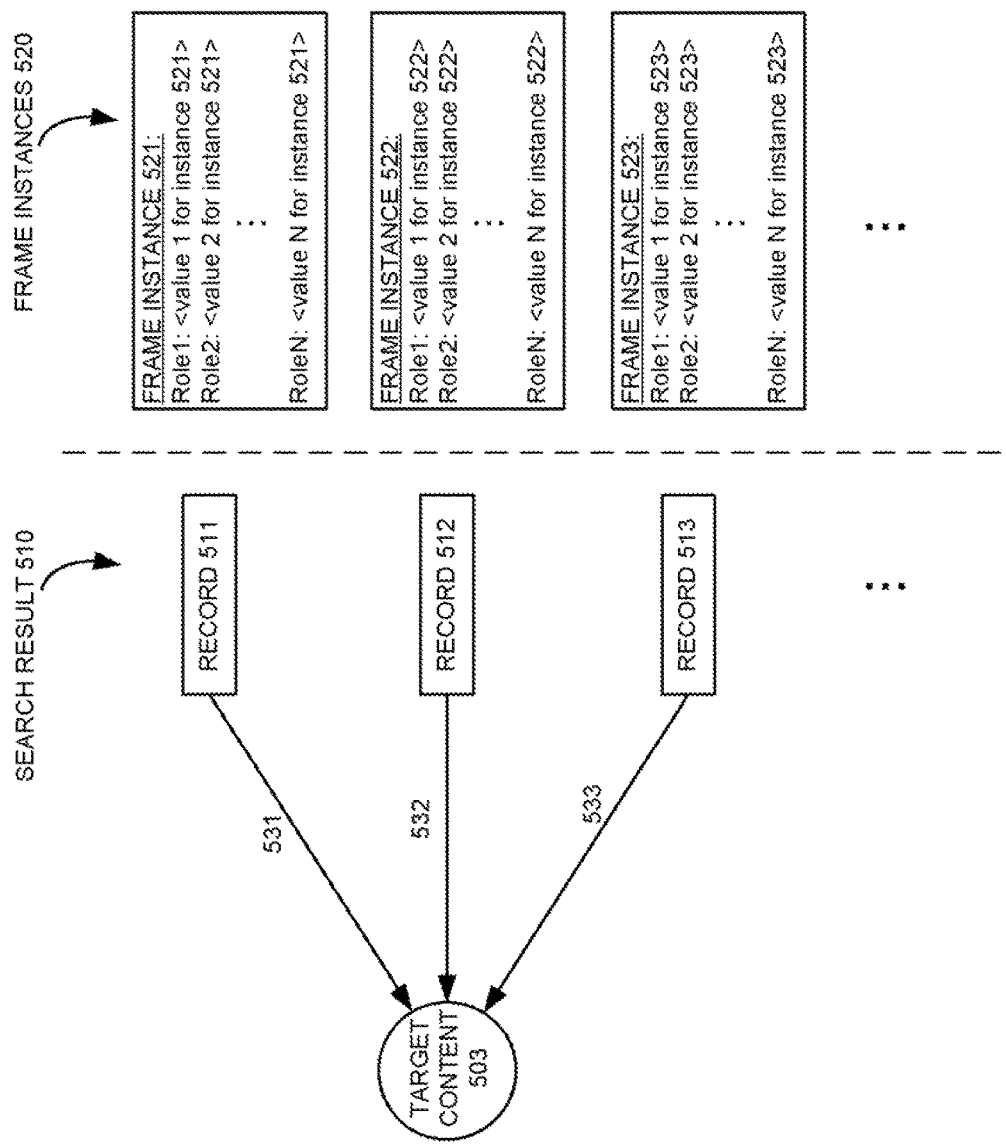

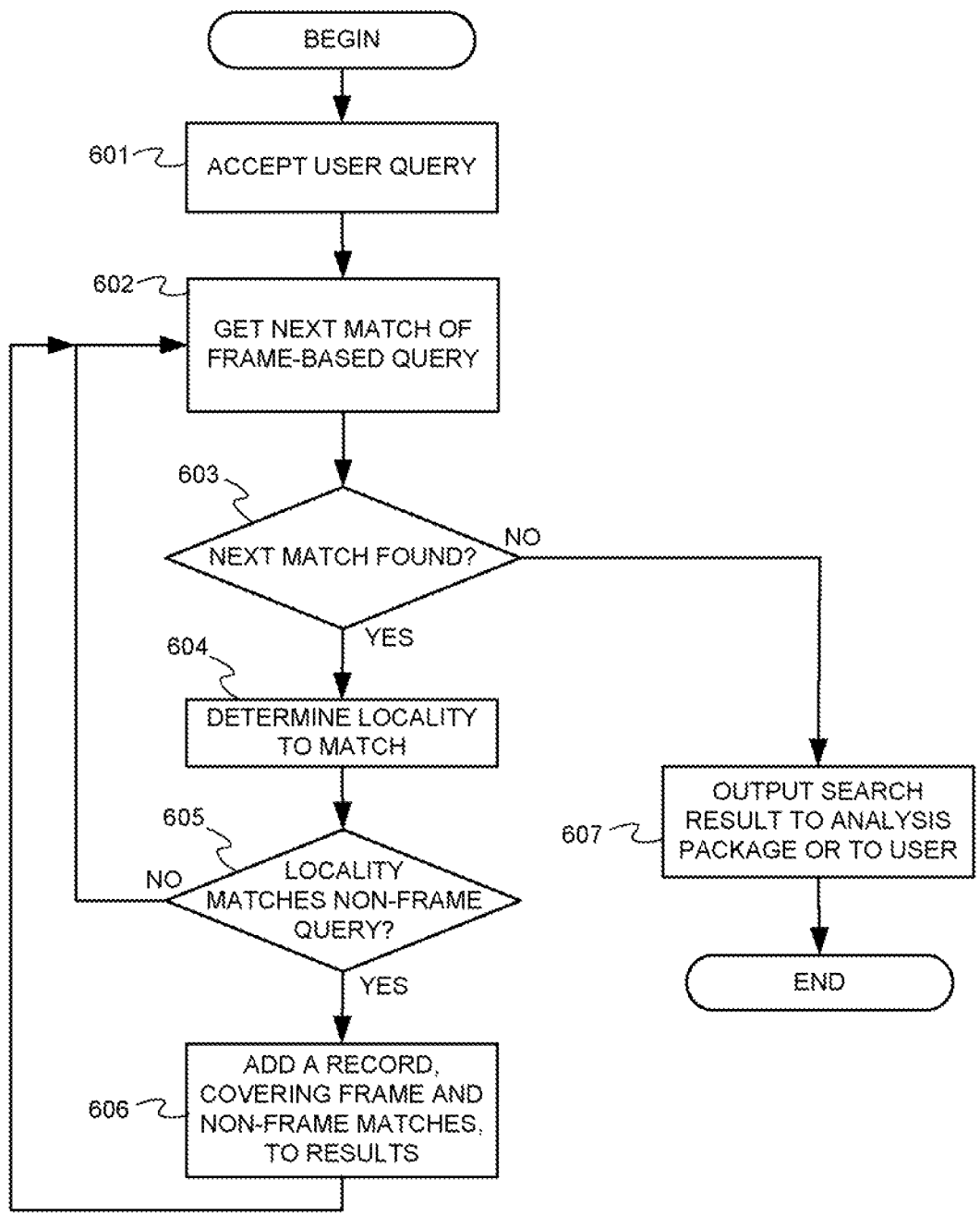

MATCH-BY-MATCH SEARCH OF COMPUTER-ACCESSIBLE CONTENT BY NON-FRAME-BASED QUERY

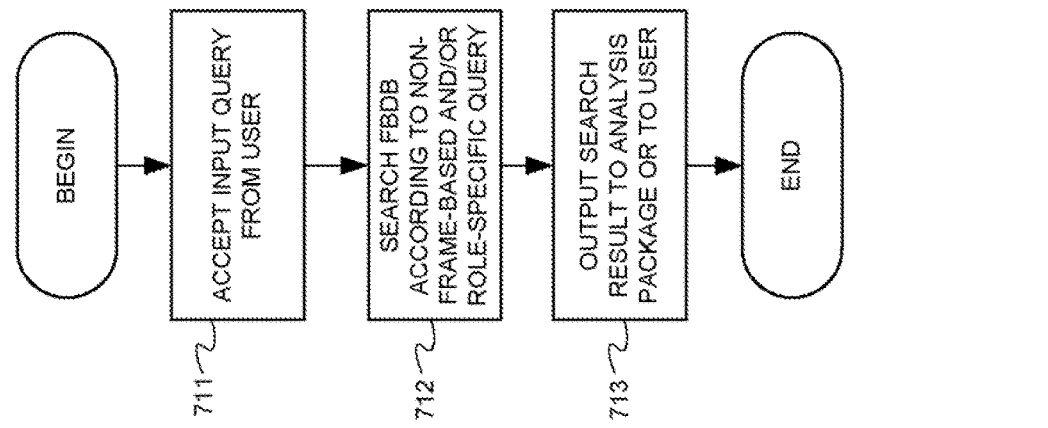
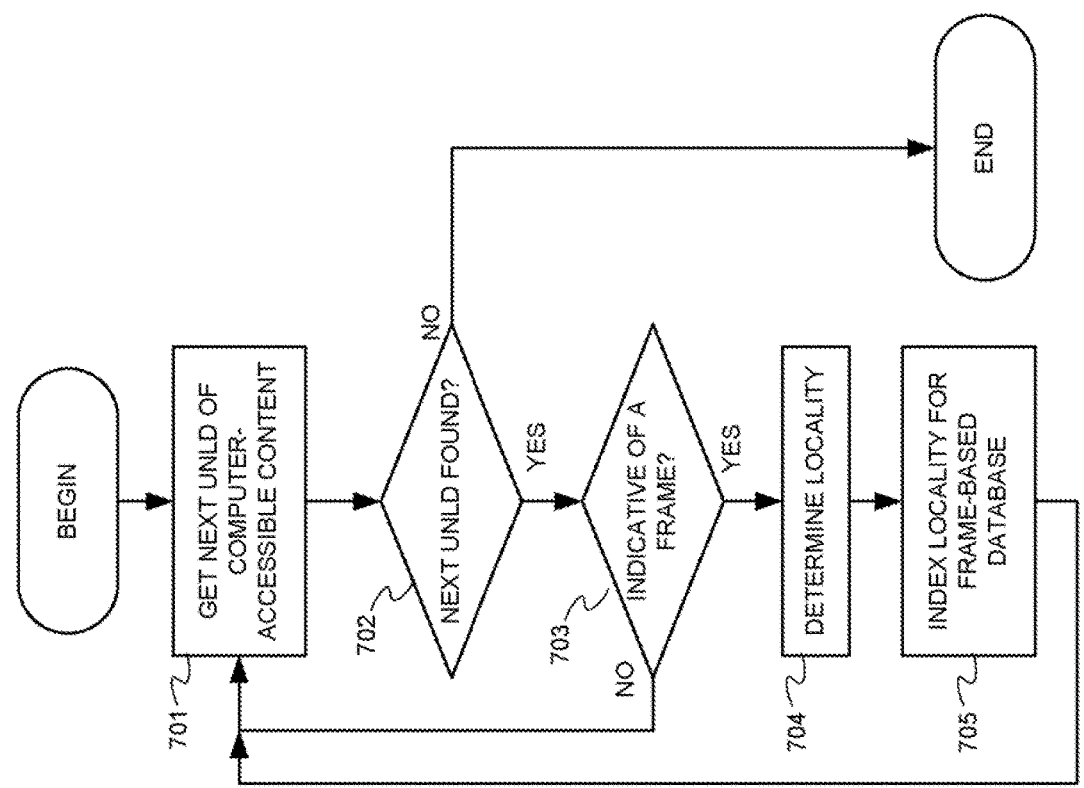

SEARCHING AN FBDB TO PRODUCE AN INITIAL RESULT AND SEARCHING THE INITIAL RESULT WITH A ROLE-SPECIFIC QUERY

PRODUCE A CONVENTIONAL INITIAL RESULT AND SEARCHING THE INITIAL RESULT WITH A FRAME-BASED QUERY

EXAMPLE QUERY INPUT SCREEN

FIGURE 11A
EXAMPLE INPUT QUERY: PROBLEM SEARCH

SEARCH INPUT:

problem: skin cancer

SEARCH BUTTON 1011

SEARCH

QUERY ENTRY BOX 1010

PAGE 1000

SEARCH HELP:

Topic, Problem or Benefit:
First, enter the appropriate keyword to indicate the type of search desired.

To choose a Topic, Problem or Benefit search, enter, respectively, one of the following keywords: "topic:", "problem:" or "benefit:".

Following the keyword, enter your search terms.

Refining a Problem or Benefit Search with a Topic Search
When doing a Problem or Benefit Search, you can get even better results by adding keywords that the search results should also relate to. This is accomplished as follows.

After entering the appropriate keyword (i.e., "problem:" or "benefit:") and its search terms, enter the keyword "topic:"

After the keyword "topic:" add the keywords that the Problem or Benefit search results should also be limited to.

FIGURE 11B
EXAMPLE INPUT QUERY: BENEFIT SEARCH

SEARCH INPUT:

QUERY ENTRY BOX 1010: benefit: prevent skin cancer

SEARCH BUTTON 1011: SEARCH

PAGE 1000

SEARCH HELP:

Topic, Problem or Benefit:
First, enter the appropriate keyword to indicate the type of search desired.

To choose a Topic, Problem or Benefit search, enter, respectively, one of the following keywords: "topic:", "problem:" or "benefit:".

Following the keyword, enter your search terms.

Refining a Problem or Benefit Search with a Topic Search
When doing a Problem or Benefit Search, you can get even better results by adding keywords that the search results should also relate to. This is accomplished as follows.

After entering the appropriate keyword (i.e., "problem:" or "benefit:") and its search terms, enter the keyword "topic:"

After the keyword "topic:" add the keywords that the Problem or Benefit search results should also be limited to.

FIGURE 12A

EXAMPLE PROBLEM SEARCH: SNIPPETS PRODUCED

SNIPPET 1210:
    It's going to be a bigger problem in the future and more noticeable as more girls tend to use sunscreen now than teenage boys of the same age." Dr. Stone recommends all exposed skin be treated with sunscreen when going out-of-doors. <u>People also can protect themselves from skin cancer by wearing a wide-brimmed hat and long-sleeved shirt.</u> He says going to a tanning salon is just as damaging as being in the sun.

Source: http://www.siumed.edu/news/Newsline%20TEXT05/6-28-05.htm

SNIPPET 1211:
    Members of the Four Tribes of Kansas may contact Shirley to schedule an individual educational session or group presentation by calling (785) 486-2775. Up to 80 percent of skin cancers occur on the head and neck. <u>Wearing a broad brimmed hat protects your face, scalp, ears, and neck against skin cancer as well as the aging effects of sun exposure!</u> Page 4. Early Detection Works patients with Paget's Disease also have underlying invasive breast cancer or ductal carcinoma in situ (DCIS). The other theory suggests that skin cells of the nipple spontaneously become Paget cells.

Source: http://www.kdheks.gov/edw/download/Partners_Spring_2006.pdf

SNIPPET 1212:
    Eating a nutritious breakfast is a wonderful way to start the day. Avoid snacking on junk food. <u>As the days get warmer, wearing sunscreen, hats, sunglasses, and shirts with sleeves can help prevent skin cancer.</u> Drink plenty of water. Please do not send your child with flip flops to school.

Source: http://edweb.tusd.k12.az.us/Brichta/Newsltters/2006-2007/march07.pdf

SNIPPET 1213:
    Hats help take the heat off harmful sun exposure. August is typically the hottest month of the year and the suns damaging UV rays can be very strong. <u>With many people taking advantage of the sunny weather this month The Skin Cancer Foundation reminds them that wearing a broad-brimmed hat can help protect the face neck and ears from skin cancer and premature aging.</u> Statistics show that more than 90 percent of all skin cancers are caused by sun exposure yet fewer than 33 percent of Americans routinely use sun protection. Wearing a hat is...

Source: http://www.skincancernews.com/statisticsandskincancer/

FIGURE 12B

EXAMPLE BENEFIT SEARCH: SNIPPETS PRODUCED

SNIPPET 1220:
Eating a nutritious breakfast is a wonderful way to start the day. Avoid snacking on junk food. <u>As the days get warmer, wearing sunscreen, hats, sunglasses, and shirts with sleeves can help prevent skin cancer.</u> Drink plenty of water. Please do not send your child with flip flops to school.

Source: http://edweb.tusd.k12.az.us/Brichta/Newsltters/2006-2007/march07.pdf

SNIPPET 1221:
To overcome these barriers, education must begin early so habits can be developed early and consistently. Still, it is never too late to start sun protective habits. <u>Adopting sun-safe lifestyle habits, limiting sun exposure during peak hours, using shade, using sunscreen, wearing cover-up clothing, sunglasses, and hats can help prevent skin cancer and photo damage.</u> The best protection is provided when all of these sunsafe behaviors are practiced together. This section contains peer-reviewed and scientifically researched sun protective messages and behaviors.

Source: http://www.nsc.org/public/ehc/sunsafe/sun82-99.pdf

SNIPPET 1222:
Things to look out for are moles that seem to be new or growing or that change color. Anything on the skin that continues to change should be examined, as should chronically scaling skin lesions. <u>Skin cancer can be prevented by avoiding sun exposure by wearing a hat when outdoors and using sun screen.</u> Dealing with the Common Cold. Cold season is rapidly approaching.

Source: http://www.greenfieldhealth.com/Portal/Health+Matters/Health+Matters+November+2006/default.aspx SNIPPET 1223:
I better eat my spinach from The Florida Masochist . <u>The latest Skin Cancer news- Eating green, leafy vegetables may be as important as wearing hats and sunscreen in the prevention of skin cancer.</u> An 11-year study by the Queensland Institute of Medical Research involving 1,000 people in Nambour, ...

Source: http://www.samanthaburns.com/archives/2006/12/open_trackbacks_14.html

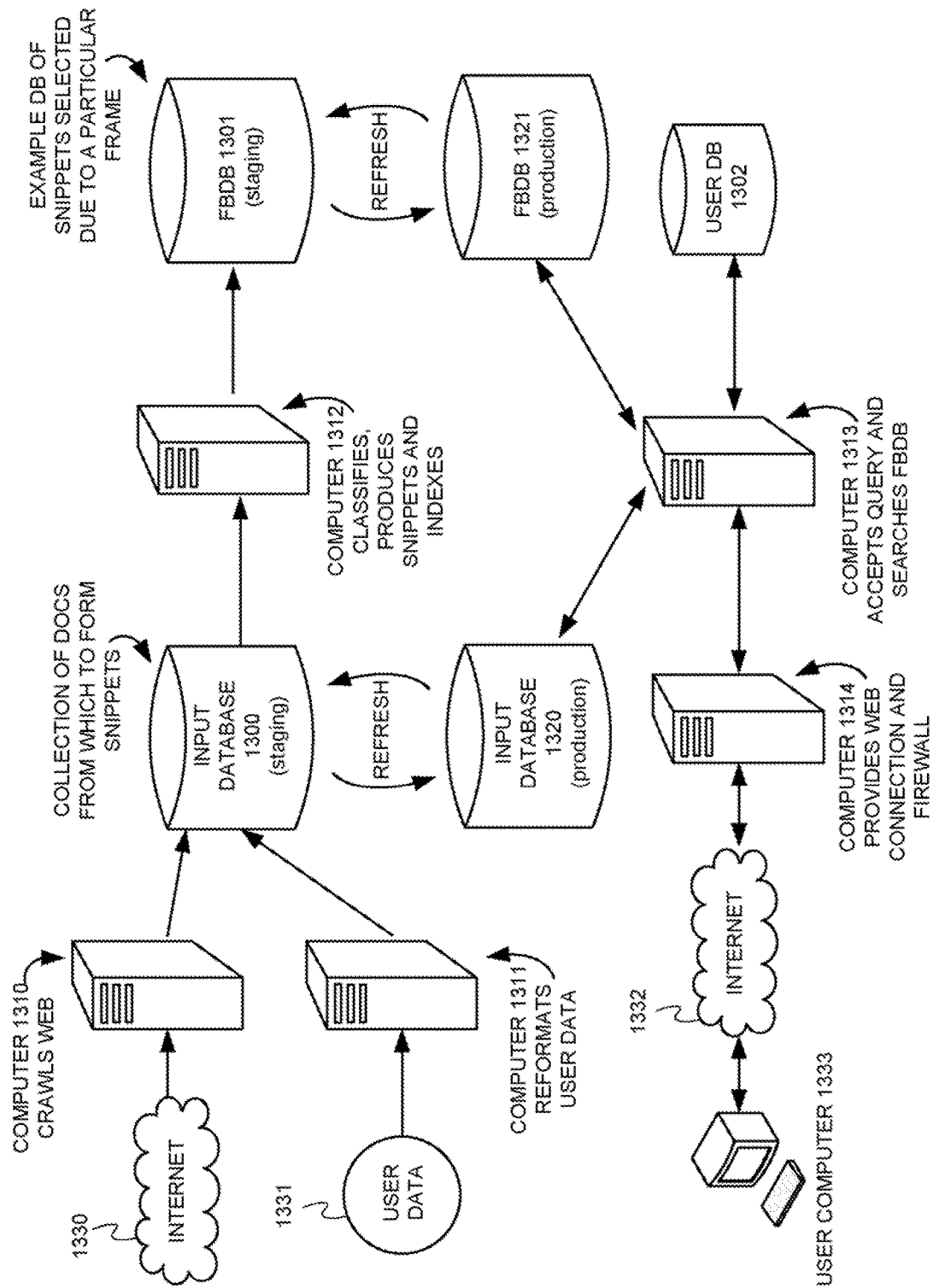

FIGURE 14A

EXAMPLE PROBLEM SEARCH: BENEFIT FRAME INSTANCES

SEARCH RESULT 1200

FRAME-BASED ANALYSIS 1400

Snippet 1210, focus sentence:

"People also can protect themselves from skin cancer by wearing a wide-brimmed hat and long-sleeved shirt."

FRAME INSTANCE 1401:
Problem: "from skin cancer"

Benefactor: NONE

Instrument: "by wearing a wide-brimmed hat and long-sleeved shirt"

Snippet 1211, focus sentence:

"Wearing a broad brimmed hat protects your face, scalp, ears, and neck against skin cancer as well as the aging effects of sun exposure."

FRAME INSTANCE 1402:
Problem: "against skin cancer as well as the aging effects of sun exposure"

Benefactor: "wearing a broad brimmed hat"

Instrument: NONE

Snippet 1212, focus sentence:

"As the days get warmer, wearing sunscreen, hats, sunglasses, and shirts with sleeves can help prevent skin cancer."

FRAME INSTANCE 1403:
Problem: "skin cancer"

Benefactor: "wearing sunscreen, hats, sunglasses, and shirts with sleeves"

Instrument: NONE

Snippet 1213, focus sentence:

"With many people taking advantage of the sunny weather this month The Skin Cancer Foundation reminds them that wearing a broad-brimmed hat can help protect the face neck and ears from skin cancer and premature aging."

FRAME INSTANCE 1403:
Problem: "from skin cancer and premature aging"

Benefactor: "wearing a broad-brimmed hat"

Instrument: NONE

EXAMPLE BENEFIT SEARCH: BENEFIT FRAME INSTANCES

SEARCH RESULT 1201

FRAME-BASED ANALYSIS 1410

Snippet 1220, focus sentence:

"As the days get warmer, wearing sunscreen, hats, sunglasses, and shirts with sleeves can help prevent skin cancer."

FRAME INSTANCE 1411:
Benefit: "can help prevent skin cancer"

Benefactor: "wearing sunscreen, hats, sunglasses, and shirts with sleeves"

Instrument: NONE

Snippet 1221, focus sentence:

"Adopting sun-safe lifestyle habits, limiting sun exposure during peak hours, using shade, using sunscreen, wearing cover-up clothing, sunglasses, and hats can help prevent skin cancer and photo damage."

FRAME INSTANCE 1412:
Benefit: "can help prevent skin cancer and photo damage"

Benefactor: "wearing cover-up clothing, sunglasses, and hats"

Instrument: NONE

Snippet 1222, focus sentence:

"Skin cancer can be prevented by avoiding sun exposure by wearing a hat when outdoors and using sun screen."

FRAME INSTANCE 1413:
Benefit: "skin cancer can be prevented"

Benefactor: NONE

Instrument: "by wearing a hat when outdoors and using sun screen"

Snippet 1223, focus sentence:

"The latest Skin Cancer news- Eating green, leafy vegetables may be as important as wearing hats and sunscreen in the prevention of skin cancer."

FRAME INSTANCE 1413:
Benefit: "in the prevention of skin cancer"

Benefactor: "leafy vegetables may be as important as wearing hats and sunscreen"

Instrument: NONE

⋮ ⋮

EXAMPLE PROBLEM SEARCH: RESULTS

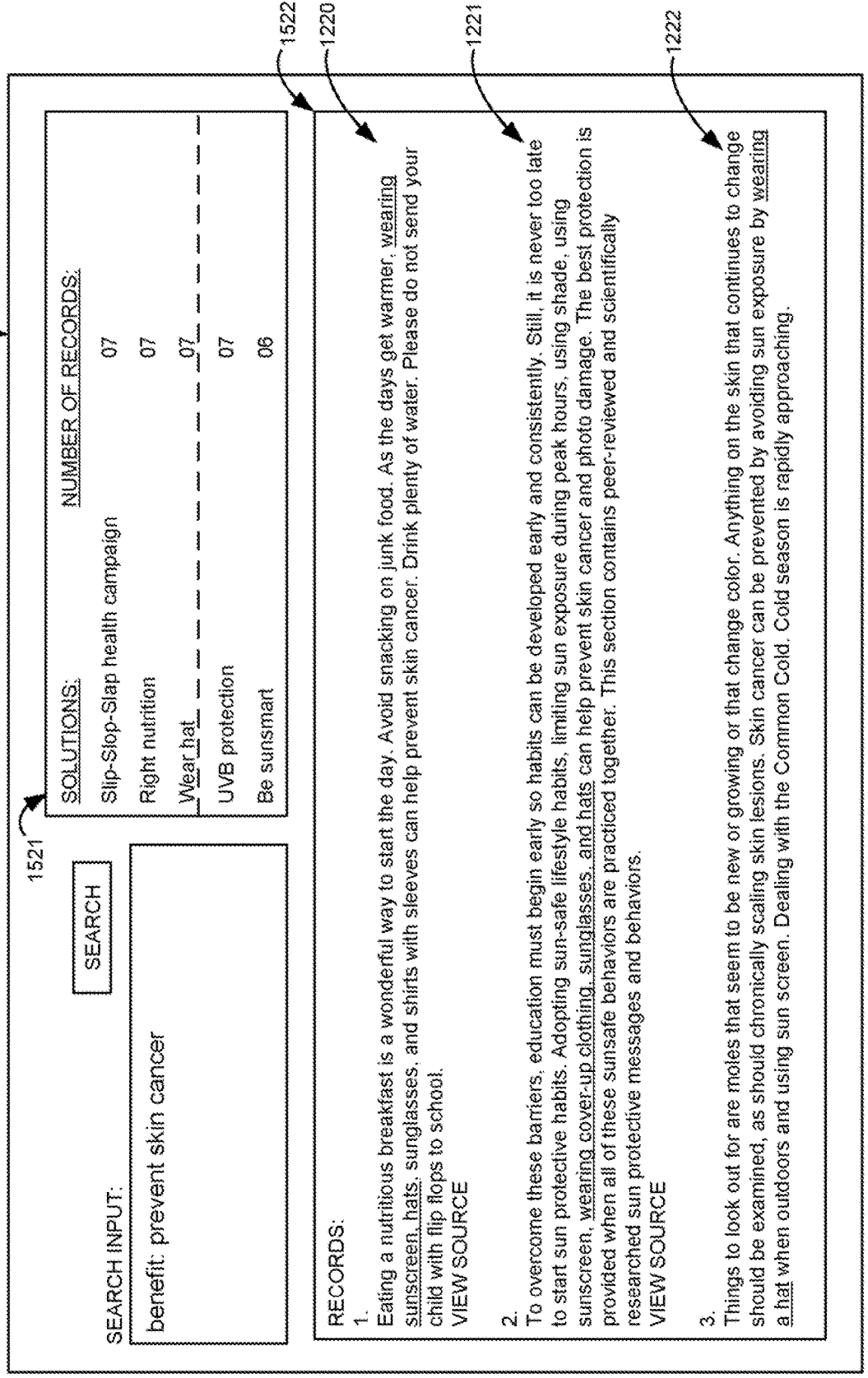

GENERIC RECORD-ORIENTED SEARCH RESULT WITH FRAME-BASED ANALYSIS

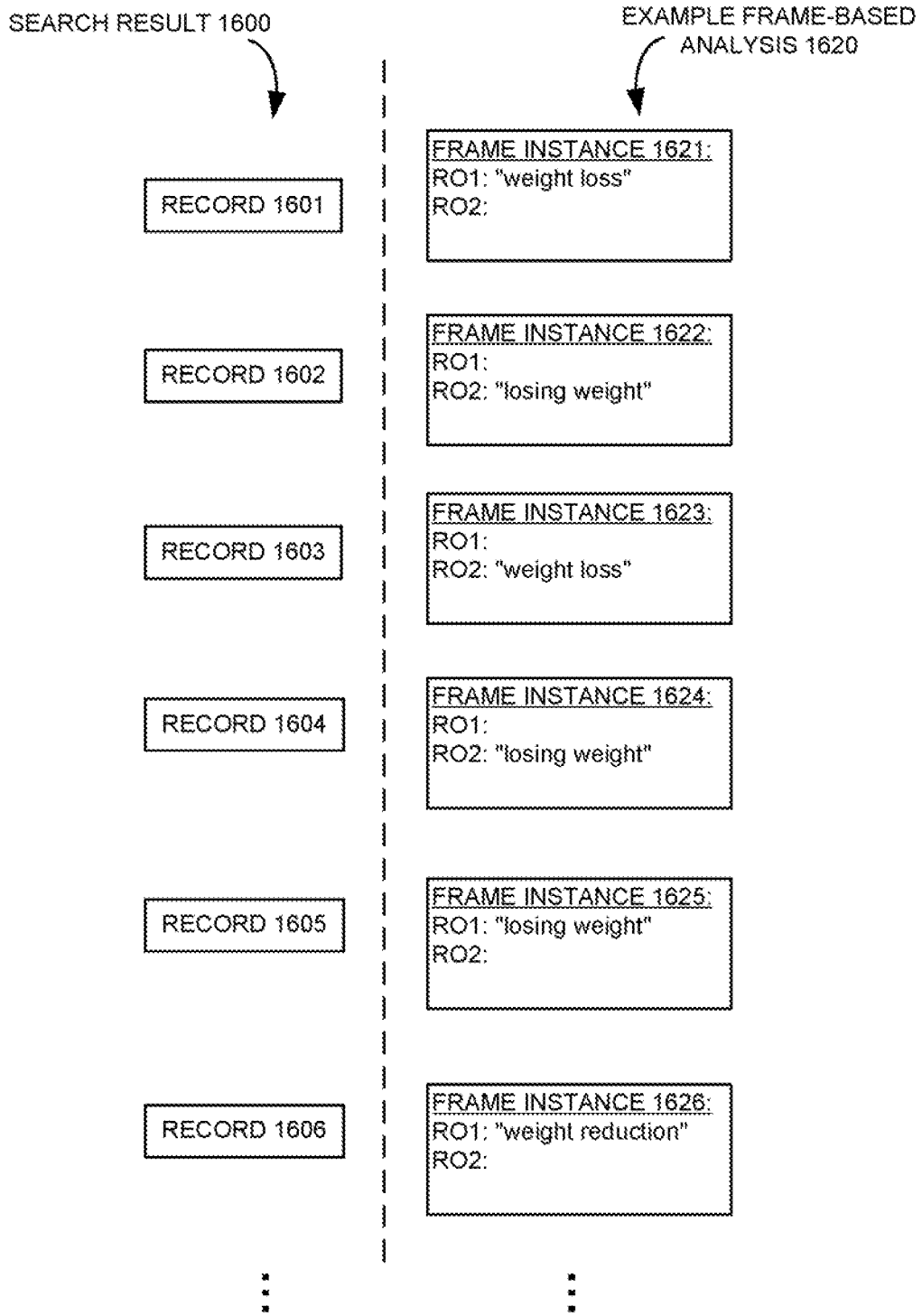

ROLE-VALUE ORIENTED SEARCH RESULT

ROLE-VALUE ORIENTED SEARCH RESULT WITH MERGING

EXAMPLE SCREEN DISPLAY OF ROLE-VALUE ORIENTED SEARCH RESULT

EXAMPLE FRAME-BASED ANALYSIS WITH CORRESPONDING LOGICAL FORM

FIGURE 19B
EXAMPLE FRAME-BASED ANALYSIS WITH CORRESPONDING LOGICAL FORM

FRAME-BASED ANALYSIS 1630

CORR LOGICAL FORMS 1910

FRAME INSTANCE 1631:
RO1: "wearing a hat"
RO2:

LOGICAL FORM 1911:
"wearing"
    Undergoer: hat

FRAME INSTANCE 1632:
RO1:
RO2: "wearing a broad-brimmed hat"

LOGICAL FORM 1912:
"wearing"
    Undergoer: hat
        Modifier: broad-brimmed

FRAME INSTANCE 1633:
RO1:
RO2: "wearing a hat"

LOGICAL FORM 1913:
"wearing"
    Undergoer: hat

FRAME INSTANCE 1634:
RO1:
RO2: "wearing a broad-brimmed hat"

LOGICAL FORM 1914:
"wearing"
    Undergoer: hat
        Modifier: broad-brimmed

FRAME INSTANCE 1635:
RO1: "wearing a broad-brimmed hat"
RO2:

LOGICAL FORM 1915:
"wearing"
    Undergoer: hat
        Modifier: broad-brimmed

FRAME INSTANCE 1636:
RO1: "wearing a red hat"
RO2:

LOGICAL FORM 1916:
"wearing"
    Undergoer: hat
        Modifier: red

⋮        ⋮

METHOD AND APPARATUS FOR FRAME BASED SEARCH

As provided for under 35 U.S.C. § 120, this patent claims benefit of the filing date of the following U.S. patent application, herein incorporated by reference in its entirety: "Method and Apparatus for Frame-Based Search," filed 2008 Jul. 21 (y/m/d), having inventors Wei Li, Michael Jacob Osofsky and Lokesh Pooranmal Bajaj, and application Ser. No. 12/177,122.

CROSS REFERENCE TO RELATED APPLICATIONS

This application is related to the following four U.S. patent applications, all of which are herein incorporated by reference in their entirety:

"Method and Apparatus For Frame-Based Analysis of Search Results," filed 2008 Jul. 21 (y/m/d), having inventors Wei Li, Michael Jacob Osofsky and Lokesh Pooranmal Bajaj, and application Ser. No. 12/177,127;

"Method and Apparatus For Concept-Based Classification of Natural Language Discourse," filed May 29, 2006, having inventors John Andrew Rehling and Michael Jacob Osofsky and application Ser. No. 11/420,782;

"Method and Apparatus For Concept-Based Searching of Natural Language Discourse," filed May 29, 2006, having inventors John Andrew Rehling and Michael Jacob Osofsky and application Ser. No. 11/420,785; and "Method and Apparatus For Concept-Based Ranking of Natural Language Discourse," filed May 29, 2006, having inventors John Andrew Rehling and Michael Jacob Osofsky, and application Ser. No. 11/420,788.

FIELD OF THE INVENTION

The present invention relates generally to searching or analyzing search results, of computer-accessible content, and more particularly to semantic processing techniques that enhance search results or the analysis of search results.

BACKGROUND OF THE INVENTION

The term "computer-based search" (or just "search") as used herein, refers to the search of any machine-accessible data using a computer. The term "search engine," as used herein, refers to any system that can perform a computer-based search. A specification of what a search engine searches for can be referred to herein as a "query" and the result, produced by the search engine, can be referred to herein as a "search result."

The utility of computer-based search is well-known and many types of search engines are available. A particularly well-known category of computer-based search can be referred to herein as "keyword-based search." In keyword-based search, the search engine accepts a query that includes at least one keyword and, with the at least one keyword, searches an indexed database. A well known example search engine, for keyword-based search, is provided by GOOGLE of Mountain View, Calif., U.S.A. A large percentage of World-Wide Web pages are accessible via the GOOGLE indexed database.

Keyword search is most effective when records, that are likely to be of interest to the user, can be located with terms that are highly specific to the topic of interest. In many instances, however, highly specific keyword terms can only partly describe the topic of interest. The problems resulting from this inability of keywords, to more fully describe certain search topics, can be twofold. First, a set of records can be returned that is too large for the user to review in a reasonable amount of time. Second, the set of records returned can include many records that are off-topic.

GOOGLE attempts to address the limitations of keywords by ranking the records (more specifically, the web pages) returned according to a "popularity" metric. According to GOOGLE, the popularity of a web page is proportional to the number of other web pages that point to it.

However, for many types of search topics, popularity is not an acceptable proxy for the portion of the topic that could not be adequately expressed with keywords.

An example kind of search, where popularity is often not an acceptable proxy, is called "technology scouting." In technology scouting, the user of a search engine is looking for an existing technology ("ET1") that can address (or solve) his or her problem ("P1"). To accomplish technology scouting, one would like to search a large portion of the Internet for that content where something (in some cases, an existing technology) is discussed as part of a solution to P1. Unfortunately, it can be difficult or impossible to express, with keywords, the requirement that certain content express the concept of "solving a problem."

It would therefore be desirable to be able to retrieve records not only on the basis of keywords, but also on the basis of whether a record expresses a concept, such as the concept of "solving a problem."

Regardless of the particular search engine by which a search result is produced, there is often a need for a post-search analysis tool by which the search result can be more effectively or easily evaluated. A post-search analysis tool can be used to re-organize a search result into a form where the information, which is of interest to the user, is more readily accessible.

For example, in the case of technology scouting, a user would likely prefer search results organized according to potential solutions (e.g., existing technologies), for the problem sought to be addressed (e.g., a problem P1).

Thus, there is a need for post-search analysis tools that enable a user to more efficiently evaluate a search result.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A presents an example frame extraction rule where the root feature is a logical verb;

FIG. 1B presents an example input statement;

FIG. 1C depicts an example Logical Form for the example statement of FIG. 1B;

FIG. 1D depicts an example frame instance from application of the frame extraction rule of FIG. 1A to the Logical Form of FIG. 1C;

FIG. 2A presents an example frame extraction rule where the root feature is an adjective;

FIG. 2B presents an example input statement;

FIG. 2C depicts an example Logical Form for the example statement of FIG. 2B;

FIG. 2D depicts an example frame instance from application of the frame extraction rule of FIG. 2A to the Logical Form of FIG. 2C;

FIG. 3A presents an example frame extraction rule where the root feature is a noun;

FIG. 3B presents an example input statement;

FIG. 3C depicts an example Logical Form for the example statement of FIG. 3B;

FIG. 3D depicts an example frame instance from application of the frame extraction rule of FIG. 3A to the Logical Form of FIG. 3C;

FIG. 4A presents an example frame extraction rule where the root feature is a verb;

FIG. 4B presents an example input statement;

FIG. 4C depicts an example Logical Form for the example statement of FIG. 4B;

FIG. 4D depicts an example frame instance from application of the frame extraction rule of FIG. 4A to the Logical Form of FIG. 4C;

FIG. 5A shows an overview of the frame-based search process;

FIG. 5B shows a generic record-oriented search result with frame instances;

FIG. 6A depicts match-by-match search of computer-accessible content by a frame-based query;

FIG. 7A presents an indexing phase;

FIG. 7B presents a search phase;

FIG. 11A depicts an example query input for a Problem Search;

FIG. 11B depicts an example query input for a Benefit Search;

FIG. 12A depicts example snippets produced for a Problem Search;

FIG. 12B depicts example snippets produced for a Benefit Search;

FIG. 13 depicts an example production environment;

FIG. 14A shows an example Problem Search with Benefit Frame instances;

FIG. 14B shows an example Benefit Search with Benefit Frame instances;

FIG. 15B shows example results for a Benefit Search;

FIG. 16B presents a generic record-oriented search result with corresponding example instances;

FIG. 19B presents example frame instances of a search result, each with an example corresponding Logical Form.

DETAILED DESCRIPTION OF PREFERRED EMBODIMENTS

Figure 6B:
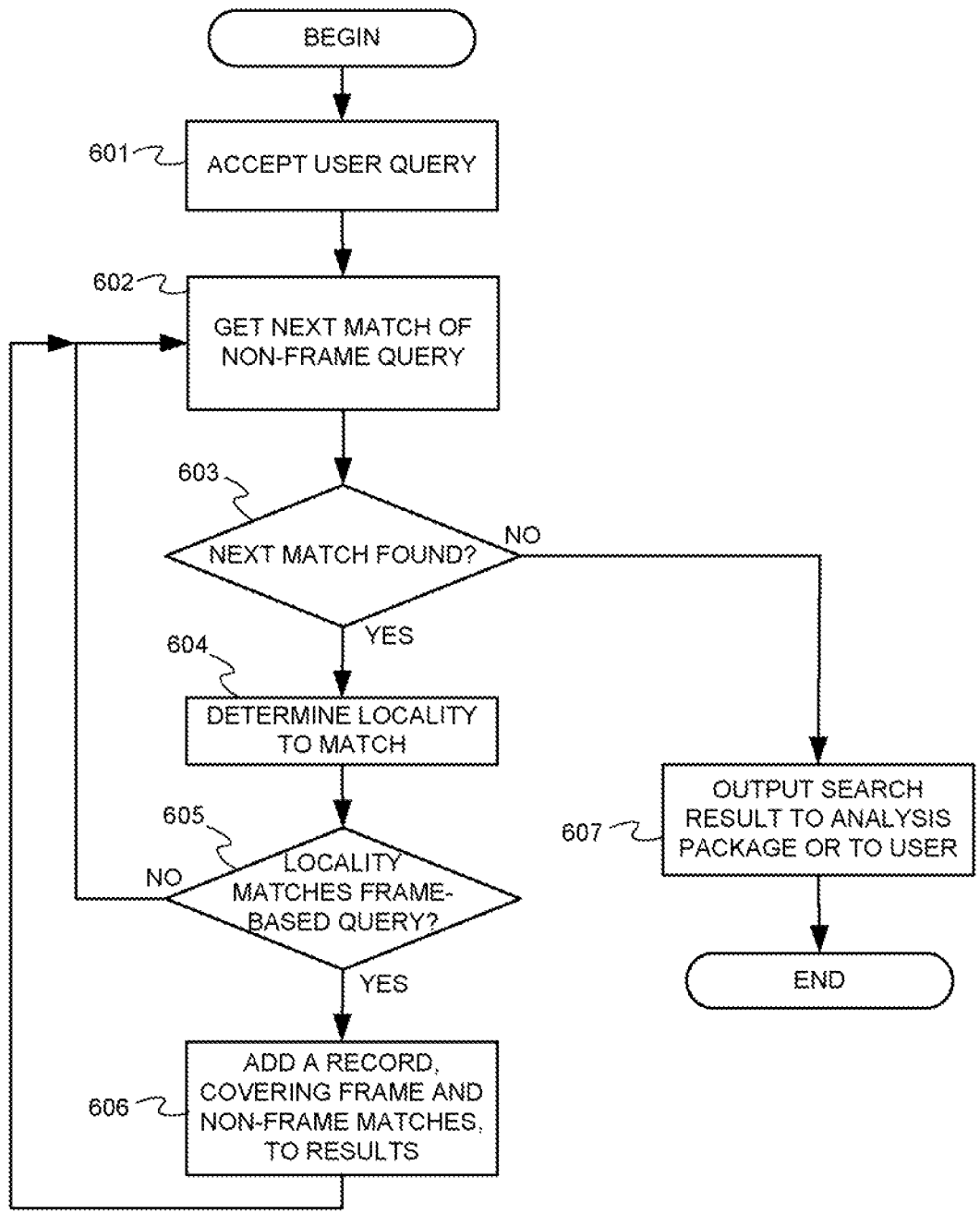
FIG. 6B depicts match-by-match search of computer-accessible content by a non-frame-based query.

Reference will now be made in detail to various embodiments of the invention, examples of which are illustrated in the accompanying drawings. Wherever possible, the same reference numbers will be used throughout the drawings to refer to the same or like parts.

Please refer to the Glossary of Selected Terms, included at the end of the Detailed Description, for the definition of selected terms used below.

TABLE OF CONTENTS TO DETAILED DESCRIPTION

1 Overview
  1.1 Frame-Based Search
  1.2 Frame-Based Analysis of Search Results
2 Examples
  2.1 Of Frame-Based Search
  2.2 Of Frame-Based Analysis of Search Results
3 Frame Extraction
  3.1 Overview
  3.2 Logical Form
  3.3 Frames
    3.3.1 Benefit
    3.3.2 Benefactor
    3.3.3 Instrument
    3.3.4 Gain
    3.3.5 Problem
    3.3.6 Beneficiary
  3.4 Frame Extraction Rules
  3.5 Example Frame-Extraction Rules and Their Application
    3.5.1 Verb Feature
    3.5.2 Adjective Feature
    3.5.3 Noun Feature
    3.5.4 Verb Lexical Unit
4 Frame-Based Search
  4.1 Implementation Approaches
    4.1.1 First Approach
    4.1.2 Second Approach
    4.1.3 Third Approach
    4.1.4 Fourth Approach
    4.1.5 Fifth Approach
  4.2 By Benefit Frame
    4.2.1 Search Types
    4.2.2 Example Searches
      4.2.2.1 Problem Search
      4.2.2.2 Benefit Search
5 Frame-Based Analysis of Search Results
  5.1 Role-value Oriented Search Results
  5.2 Role-value Merging
  5.3 Examples
    5.3.1 First Example
    5.3.2 Second Example
    5.3.3 Problem Search
    5.3.4 Benefit Search
6 Further Details
  6.1 Snippet Formation
  6.2 Features
  6.3 Other Frames
    6.3.1 Problem Frame
    6.3.2 Technology Frame
  6.4 Production Environment
  6.5 Other Environments
7 Glossary of Selected Terms 1 Overview As used herein, a "frame" can be used to represent any concept "C1" that satisfies the following two conditions:

(i) it can be decomposed into a set "R1" of constituent "roles;" and (ii) a set of linguistic rules "LR1" can be written that determine when C1 is invoked by a unit of natural language discourse of a human language "L" (where "unit of natural language discourse" or UNLD is defined below in the "Glossary of Selected Terms").

A UNLD "invokes" a concept C1 when that UNLD uses linguistic expressions in such a way that C1 is regarded as expressed, used or invoked by an ordinary reader of "L." The UNLD focused-on herein is the sentence. Ideally, LR1 is able to detect whenever C1 is invoked and thereby invoke the frame utilized for representing C1.

"Frame extraction," as used herein, refers to the utilization of an LR1 to determine whether a frame is invoked by a UNLD. When it has been determined that a frame is invoked, a frame instance is produced. A frame instance specifies how the frame-invoking UNLD fulfills, with particular values drawn from the UNLD, the roles of the frame. Frame extraction is the basis for frame-based search and frame-based analysis of search results.

1.1 Frame-Based Search

The basic problem addressed, by frame-based search, is depicted in FIG. 5A. The inputs to a search process 500 include the following: a user query and a source of computer-accessible content (called the "target content 503"). The output is a search result 504. The user query can be comprised of the following two parts: a frame-based query 501 and a non-frame-based query 502. The frame-based query can be role-specific (e.g., search terms can be sought for within certain roles) or implicit (e.g., it can be implicit that a search result, in addition to satisfying the non-frame-based query, invoke a particular frame). An example non-frame-based query can be a typical keyword-based search query.

FIG. 5B depicts a further representation of search result output 504. FIG. 5B depicts a search result 510, comprised of a series of records. For search result 510, only three example records (511-513) are shown. Each record of search result 510 represents a locality to a location, within target content 503, where the user query matched. A locality can also be referred to as a "snippet," the formation of which is discussed further below (see section 6.1 "Snippet Formation" and Glossary of Selected Terms).

Each record, of search result 510, can be represented in a variety of ways. A record can represent a locality by referring back to the portion of target content 503 (such as a web page or document) from which it is derived. Alternatively, or in addition, a record can represent a locality by containing a copy of a portion of the target content 503. The fact that a relationship is maintained, between search result 510 and target content 503, is represented by arrows 531-533.

Each record, of search result 510, is a result of the creation of a corresponding frame instance. Such corresponding instances are represented, in FIG. 5B, by frame instances 520. As can be seen, for each example record 511-513, frame instances 520 contains a corresponding frame instance 521-523. Frame instances 520 can be kept, as part of search result output 504, or they can be discarded. A reason for keeping frame instances 520 is to use them in a frame-based analysis of a search result, discussed further below (see sections 1.2 and 5, both entitled "Frame-Based Analysis of Search Results"). In FIG. 5B, each frame instance is comprised of "N" roles, labeled "Role1" to "RoleN." For each role of each frame instance, a value (drawn from the UNLD that caused the frame invocation) can be assigned. For example, a value assigned to Role1 of frame instance 521 is depicted in FIG. 5B as: <value 1 for instance 521>.

If a record "Rec_1" is included in search result 510 just because of an implicit frame-based query, then it is included just because a corresponding instance "CI_1" has been created. If a record "Rec_2" is included in search result 510 because of a role-specific frame-based query "RSQ1," then it is included not only because a corresponding instance "C1_2" has been created, but because at least one specific search term (of query "RSQ1") has been found in the value for at least one role of corresponding instance "C1_2."

Frame-based search can be accomplished using any of the following implementation approaches.

A first implementation approach is to perform a "match-by-match" search of the target content according to the frame-based query. For each match of the frame-based query, a locality to such query, in the target content, can be determined. Within such locality, the non-frame-based query can be applied.

A second implementation approach is to perform "match-by-match" search of the target content according to the non-frame-based query. For each match of the non-frame-based query, a locality to such query, in the target content, can be determined. Within such locality, the frame-based query can be applied.

A third implementation approach is to create a frame-based database (or FBDB) from the target content. An FBDB is a collection of records, indexed for searching, where a record is included in the FBDB if it invokes a particular frame (where the particular frame is called the "organizing frame" of the FBDB). An FBDB, where the organizing frame is F1, can also be referred to by the notation FBDB(F1).

An FBDB can be searched, in any of a variety of ways, by a non-frame-based query. When an FBDB is searched by a non-frame-based query there is also, at least, an implicit frame-based query (since the FBDB was created based upon whether a frame is invoked). Alternatively, at least some role-specific frame information, extracted at the time of creating the FBDB, can be saved for use during search of the FBDB. For example, the index to the FBDB can include role information so that a search of the FBDB can be limited to searching text that has been identified as representative of a particular role or roles. In this case, the user query can include both a role-specific frame-based query and a non-frame-based query.

A fourth implementation approach is to first search the FBDB according to a non-frame-based query to produce an initial search result. The initial search result can then itself be searched, by a role-specific frame-based query, on a match-by-match basis to produce a second search result.

A fifth implementation approach is to first search the target content, according to a non-frame-based query, to produce an initial search result. The initial search result can then itself be searched, by a frame-based query, on a match-by-match basis to produce a second search result.

1.2 Frame-Based Analysis of Search Results

In frame-based analysis of a search result, frame information is extracted from a search result and used as a basis for presenting such search result to a user. The search result, to which the frame extraction is applied, can be the result of any search method, including conventional keyword searching.

To better understand frame-based analysis of a search result "SR1" (such as that shown in FIG. 5B), the set of roles R1, of the frame by which SR1 is to be analyzed, can be divided into two groups:

(i) $R1_{input}$: the "input" roles by which a user may want to conduct a search, to produce a search result, such as SR1; and (ii) $R1_{output}$: the "output" roles that contain the kind of information sought by the user.

Typically, at least with respect to a particular search, $R1_{input}$ and $R1_{output}$ are disjoint. This is because, usually, a user wants to know more than just whether a search query appears in searched computer-accessible content. Usually, a user is interested in information that is different from, but related to, the information of the query. Such relationship, between the information of the query and the sought-for information, can be expressed by a frame.

Each unique text fragment of SR1, that is representative of a member of $R1_{output}$, can be presented to the user as an item of sought-for information. Additionally, text fragments that have the same (or very similar) meaning can be identified, merged and presented to the user as a single group.

2 Examples 2.1 Of Frame-Based Search

As discussed above, many computer-based searches are performed for the purpose of technology scouting. Consider the following example. A for-profit company "XYZ, Inc." has a problem (called "P1") for which it would like to find potential solutions.

For this search task, the target content to be searched can comprise a large portion of the Internet-accessible content (such as web pages or documents) that is technologically oriented. In this target content, a suitable frame to find instances of is the Benefit Frame. The Benefit Frame captures the semantics of something "Good" happening (see Glossary of Selected Terms for definition of "Good"). The Benefit Frame is invoked, in a UNLD (such as a single sentence), when that UNLD discusses something as providing some kind of positive or good action (the definition of Benefit Frame is further discussed in section 3.3 "Frames").

When searching for an existing technology to solve P1, an instance of a Benefit Frame can be useful since it indicates a location in the target content where, at least implicitly, a problem of some kind is being addressed (or solved). This is because something that provides some kind of benefit is regarded as doing so, in general, because it addresses some kind of problem.

The universe of Benefit Frame invocations found can be limited to those that might relate to XYZ, Inc.'s concerns by only presenting to the user those that also match a suitable user query (which can contain a role-specific query and/or a non-frame-based query).

The remainder of this section describes an example frame-based search. This example is addressed further in section 4.2.2 "Example Searches."

Figure 10:
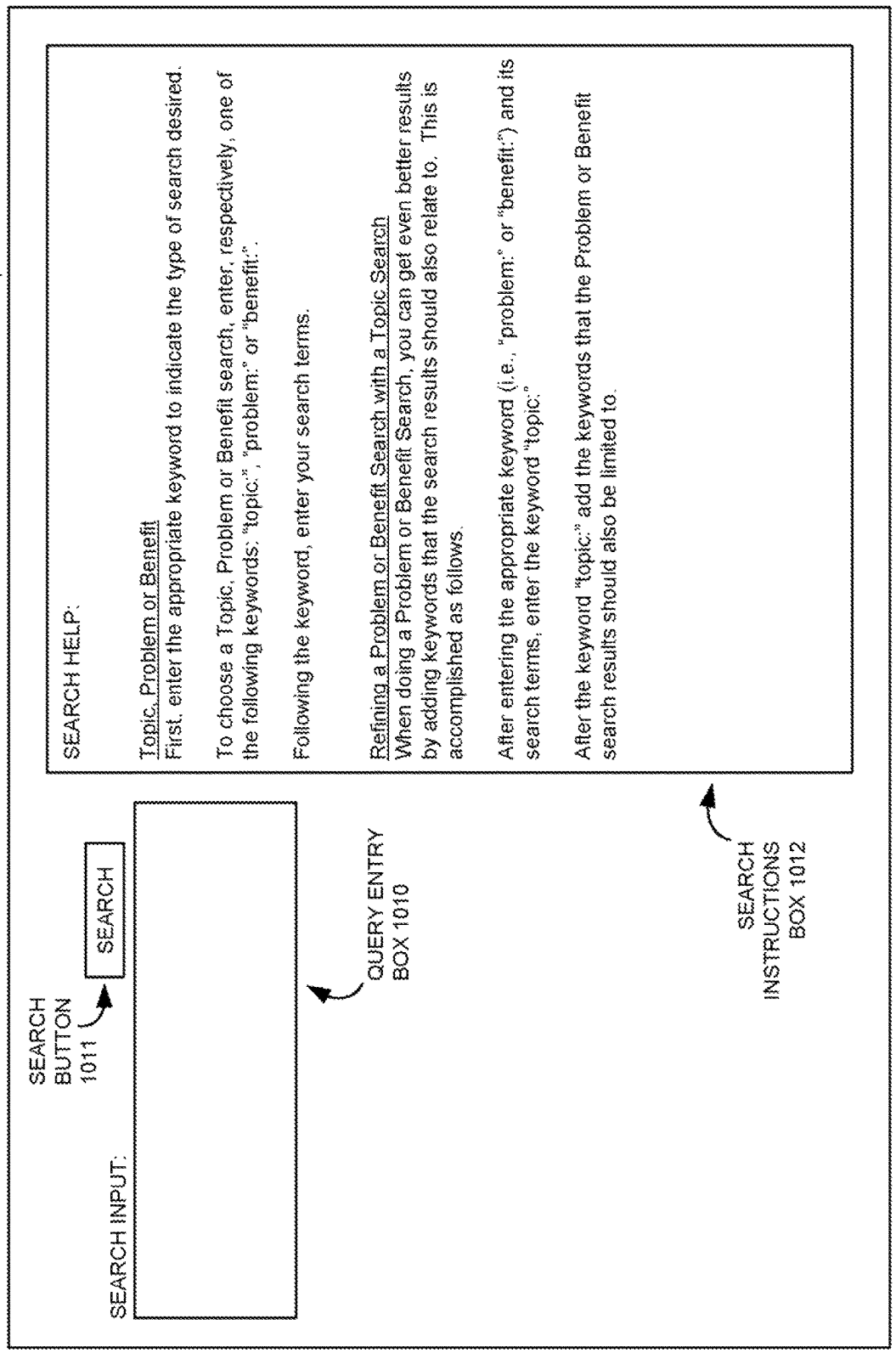
FIG. 10 depicts an example query input screen.

FIG. 10 depicts an example screen 1000 with graphical user interface by which to enter search queries for the purpose of technology scouting. A user query is entered into query box 1010 and a search initiated by selecting search button 1011.

FIG. 11A depicts the same example screen 1000 of FIG. 10, except a role-specific query has been entered in query box 1010. The role-specific query, of query box 1010, is comprised of the words "skin" and "cancer." These search terms are prefixed by "problem:" The prefix indicates that the role, in which the query will be searched, is called "Problem" (this role is explained in section 3.3.5 "Problem," but the particular meaning of this role is not relevant for understanding the current example). Thus, the technology scouting system will search for Benefit Frame instances where the words "skin" and "cancer" appear in the Problem role.

FIG. 12A depicts four example snippets (1210-1213) that can comprise part of the search result produced in response to the search query of FIG. 11A. For each of snippets 1210-1213, its "focus sentence" is underlined. FIG. 14A depicts the same four example snippets (1210-1213), but only the text of the focus sentence is shown. FIG. 14A also shows, for each snippet, a corresponding frame instance (1401-1403). For each frame instance, its values are determined from the focus sentence of its corresponding snippet. While the particular wording varies, it can be seen that the Problem role of each frame instance contains the words "skin" and "cancer," thus explaining why the snippet is part of the search result.

2.2 of Frame-Based Analysis of Search Results

While the above example shows some of the usefulness of frames in determining a search result, the search result itself, in FIGS. 12A and 14A, is still organized on a record-oriented basis.

However, rather than being presented to the user in a record-oriented format, a search result can be presented to the user organized according to the values that appear in the output roles of the corresponding frame instances. Such a result can be called a "role-value oriented" search result.

For example, in the case of FIG. 14A, let us assume that the output roles (i.e., the roles that can contain information the user is seeking) are Benefactor and Instrument (these roles are explained in sections 3.3.2 "Benefactor" and 3.3.3 "Instrument," but the particular meaning of these roles is not relevant for understanding the current example). Each unique value, in either of these roles, can be collected into a list that is presented to the user as a role-value oriented search result. If the user selects an item, of the role-value oriented search result, the appropriate snippets (i.e., those snippets whose corresponding frame instances have the selected item as a role-value) can be displayed to the user.

Figure 15A:
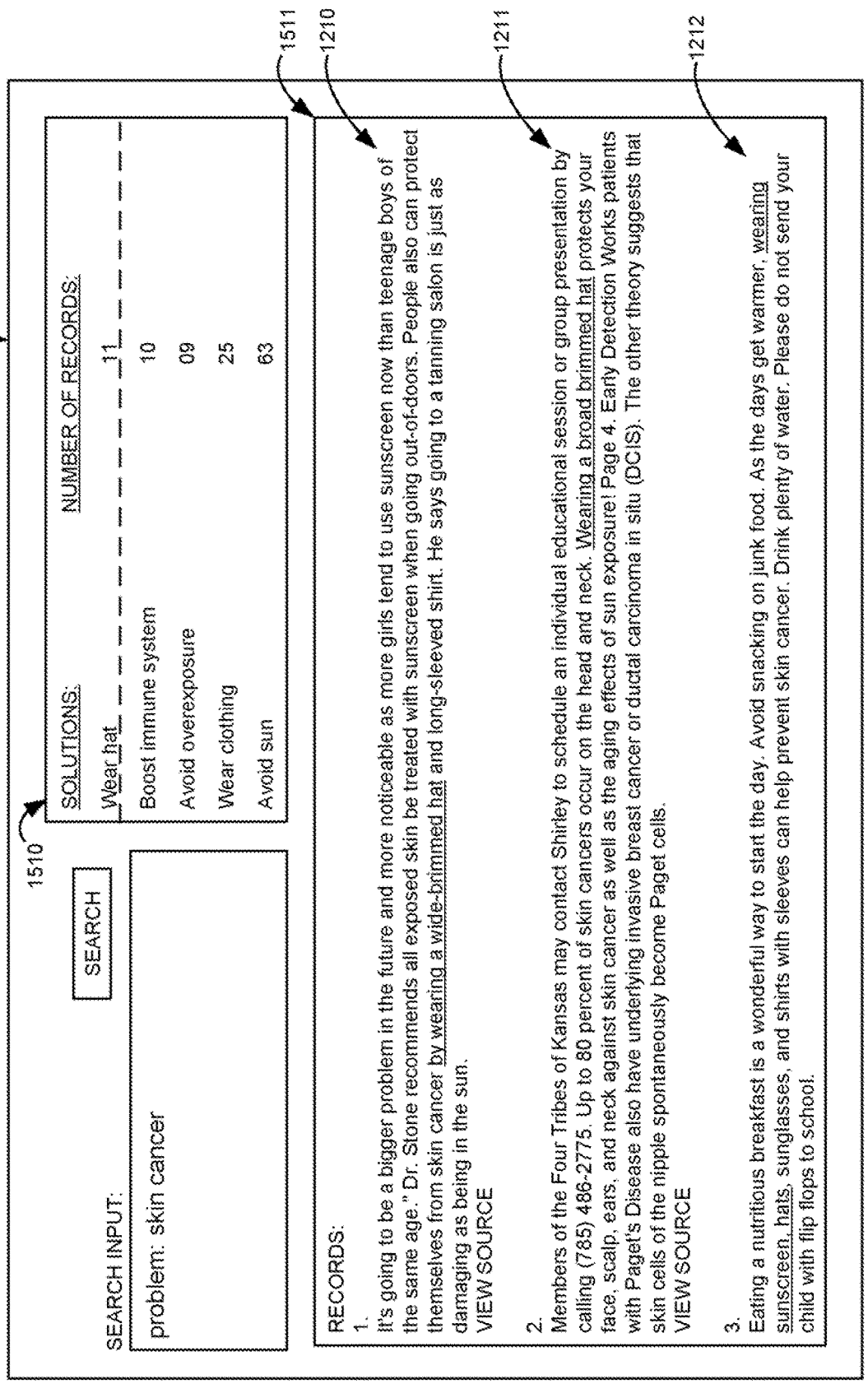
FIG. 15A shows example results for a Problem Search.

FIG. 15A depicts an example computer screen 1500 in which is displayed a role-value oriented search result box 1510 for the above-discussed "skin" and "cancer" search (the search is discussed in section 2.1 "Of Frame-Based Search"). Result box 1510 shows only a portion of the list of role-values that is compiled from the search. When the user selects a value in result box 1510 (such selection indicated in FIG. 15A by dashed underlining), the appropriate snippets are displayed in snippet display box 1511. As can be seen, the role-value "Wear hat" is selected in box 1510. Rather than being an exact value, for a frame instance role, selected item "Wear hat" is a generalization of the role values appearing in several frame instances.

The "Wear hat" generalization is determined from the frame instances of FIG. 14A. As can be seen, each frame instance of FIG. 14A has a value in either the Benefactor or Instrument role. Furthermore, it can be seen that each value, for the Benefactor or Instrument role, describes the general technique of wearing a hat. Using techniques (called "merging") described below (sections 5.2 "Role-value Merging" and 5.3 "Examples"), it is determined that all such role values can be represented by the general value "Wear hat."

Since the generalized role value "Wear hat" is selected in box 1510, snippets 1210-1213 are available for viewing by the user in snippet display box 1511 (with display box 1511 only being large enough to show three snippets at one time). In FIG. 15A, snippets 1210-1212 are shown in display box 1511.

3 Frame Extraction

3.1 Overview

As discussed above, "frame extraction" refers to the utilization of a set of linguistic rules LR1 to determine whether a frame is invoked by a UNLD.

More specifically, frame extraction, for a frame F1, involves the following three steps:

(i) production of a Logical Form representation "LF1," for a UNLD "X1," to be tested for whether it invokes a frame;

(ii) determination of whether a frame extraction rule "FER1" (of the set of frame extraction rules represented by LR1) matches against Logical Form LF1; and (iii) if a frame extraction rule matches, production of a frame instance "FI1" that captures how UNLD X1 fulfills the roles of a frame F1.

The frame instances produced can then be used, depending upon the application, for frame-based search or frame-based analysis of search results.

3.2 Logical Form

As discussed above, a Logical Form representation is produced from analysis of an input statement that is a UNLD (the UNLD focused-upon herein is a sentence). The Logical Form can be produced by what is known as, in the field of natural language processing, a "semantic parser." A Logical Form is intended to represent the semantics of its input statement. For this reason, it is desirable to produce a Logical Form that is, as much as possible, "semantically canonical." This means that input statements with the same underlying meaning, despite differing syntax, are converted to the same Logical Form. For example, a semantically canonical semantic parser, if given a passive sentence and an active sentence that both express the same meaning, will try to translate both sentences into the same Logical Form.

The Logical Form can comprise a collection of nodes, where each node represents a fragment of the input statement.

If arranged in a tree form, such nodes (with their links) can be referred to as a "logical dependency tree." Some characteristics, of a dependency tree, are as follows:

The root node is typically a logical verb (for a definition of logical verb, see "Glossary of Selected Terms").

Each node, where the node is under the root node, can be called a "semantic constituent."

A child node, at a level "n" of a dependency tree, is governed by its parent node at level n−1.

Semantic constituents comprise at least the following two types: core and modifier. Core semantic constituents specify key information, such as "who did what to whom." A core semantic constituent is also called (in the field of natural language processing) an "argument." Modifier semantic constituents carry information about other aspects of an action, that are optional or are only sometimes applicable.

Three core semantic constituents, and their definitions, follow:

Actor: the logical subject

Undergoer: the logical object

Complement: a secondary logical object, other than the Undergoer.

Defined by a subcategorization feature of a logical verb.

Example modifier semantic constituents, and the types of questions they answer, include the following:

Time: answers the question of "when" did something happen

Location: answers the question of "where" did something happen

Cause: answers the question of "why" did something happen by denoting the cause of an action.

Examples, that help illustrate the above-listed semantic constituents, follow.

Because the Actor and Undergoer are logical, a passive and an active sentence, which both express the same meaning, will have the same Actor and Undergoer. For example, in both of the following sentences, "exercise" is the Actor and "bone density" is the Undergoer:

"Bone density can be enhanced by exercise" (passive form)

"Exercise can enhance bone density" (active form)

In both of the following examples (which are in ergative form at a surface level), the Undergoer is "the door":

"the door is opened"

"the door opens"

For both of the following sentences, "John" is the Actor, "book" is the Undergoer and "Mary" is the Complement:

"John gave Mary a book"

"John gave a book to Mary"

For the following phrase, "somebody" is the Undergoer and "for something" is the Complement:

"blame somebody for something"

The modifier semantic constituent Cause can be identified by searching for particular expressions that are indicative of something being a cause. Such expressions can include: "due to," "thanks to," "because of" and "for the reason of." In one of the above example sentences, depending upon the semantic parser, "by exercise" can be identified as the Cause for the action "can be enhanced."

FIG. 1C depicts an example Logical Form that can be produced from the example input statement of FIG. 1B. Each line of FIG. 1C represents a node, while the tree structure is indicated by the indentation of the lines. The greater the indentation of a line (i.e., the further a line is from the margin), the further it is from the tree's root. A Logical Form node "LN1" and a Logical Form node "LN2" are, respectively, in a parent and child relationship when LN1 is the first Logical Form node that is both above LN2 and has a lesser indentation than LN2. For example, in FIG. 1C, each of lines 2-3 specifies a node that is a child of the node specified by line 1. Logical Form nodes "LN1" and "LN2" are in a sibling relationship when the following conditions are satisfied:

LN1 and LN2 are at the same indentation level; and between LN1 and LN2 there is no other Logical Form rule with a lesser amount of indentation.

For example, in FIG. 1C, line 2 specifies a sibling to the node specified by line 3.

Each node of a Logical Form, with the exception of the root node, can be represented by the following two parts:

1) a semantic-constituent indicating part; and 2) a textual part, that specifies the fragment of the input statement represented by the node.

In FIG. 1C, each of lines 2-4 represents a non-root node, with the semantic-constituent indicating part being to the left of a colon symbol and the textual part being to the right of the same colon symbol.

The root node of a Logical Form can be represented by the following two parts:
1) a root indicating part (that can be implicit); and
2) a textual part, that specifies the fragment of the input statement represented by the node.

In FIG. 1C, line 1 represents the root node, with the root indication being implicit (from the fact that line 1 has the least indentation) and the textual part comprising the text of the line.

3.3 Frames

A frame instance can be represented as a set of attribute-value pairs. Each attribute-value pair is comprised of, respectively, a role and a value for such role.

For a frame instance FI1, that represents how a UNLD X1 invokes a frame F1, each of its attribute-value pairs can be comprised as follows. The role, RX, is a member of F1's set of roles RI. The value, RV, represents how UNLD X1 fulfills RX. RV can include one or both of the following:
- A node, RN, of the Logical Form representation LF1, of X1, that is a basis for the determination that F1 is invoked; and
- The fragment of X1 represented by the textual part of RN.

As discussed above, an example frame, useful for technology scouting searches, is the Benefit Frame. While the Benefit Frame was introduced above in general terms, the following is a set of 6 roles into which the concept, of something providing some kind of positive (or good) action, can be decomposed:
1) Benefit
2) Benefactor
3) Instrument
4) Gain
5) Problem
6) Beneficiary Each of these roles is now discussed, in turn.

3.3.1 Benefit

The value for the Benefit role is a sub-part, of the UNLD that invokes the Benefit Frame, that represents the good action. The value of the Benefit role answers the question: "what is the good action?" A Benefit value can be a statement governed by a logical verb (also known as a "verbal statement"). A verbal statement is typically in verb-object form. Example verbal statements, that can be identified as a Benefit, are as follows:
  increase bone density
  enhance product quality
  decrease noise

3.3.2 Benefactor

The value for the Benefactor role describes an entity that is responsible for creating, or actively doing, the good action. The value of the Benefactor role answers the question: "who did this good action?" Typical entities are a person or an organization.

3.3.3 Instrument

The value for the Instrument role describes that which contributes to the good action. The value of the Instrument role answers the question: "what thing or action is used to achieve the good action?" An Instrument can be almost anything, that would not typically be given the "entity" status that is accorded to a Benefactor. An Instrument can even be another action that causes the good action of a Benefit Frame invocation (e.g. the action of "hard work" can be an Instrument that causes a good action to happen). Typical Instruments include the following: a tool with a beneficial function or a substance (such as a drug) that has beneficial properties.

3.3.4 Gain

The value for the Gain role is typically a proper sub-part of the value for the Benefit role. There are two main types of values that can be assigned to the Gain role: aspect and subject-area.

An aspect type value, for the Gain role, is so-called because it represents the aspect that is positively effected by the good action. An aspect is typically an abstract quality or a measurement of some kind. The value of the Gain role, if it is of type aspect, answers the question: "in what aspect does something get enhanced by the good action?" If an entity is positively effected (rather than an aspect), the value is assigned to the Beneficiary. An example is as follows: for the Benefit value "increase bone density," the "bone density" sub-part is the Gain.

A subject-area type value, for the Gain role, is so-called because it represents the subject area where the good action lies. (In the prior sentence, "where" is used abstractly and does not refer to a physical location.) Subject-area can include a category of technology. The value of the Gain role, if it is of type subject-area, answers the question: "in what subject area does the good action occur?" For the example sentence "iPod is the best product in digital music," "is the best product in digital music" can be a Benefit value and the subject-area sub-part of the Benefit, "digital music," can be a Gain value.

3.3.5 Problem

The value for the Problem role represents the problem solved by the values of the Benefactor or Instrument roles. The value of the Problem role answers the question: "what problem has been addressed (e.g., resolved, treated or prevented) by the good action?"

3.3.6 Beneficiary

The value for the Beneficiary role represents an entity that is the recipient of a Gain or whose Problem is solved. As with a Benefactor, typical entities are a person or an organization. The value of the Beneficiary role answers the question: "who benefits from the good action?"

3.4 Frame Extraction Rules

As discussed above, a frame extraction rule specifies a pattern that matches against a Logical Form which has been produced from an input statement. If the frame extraction rule matches, a frame instance is produced.

An overall structure, for a frame extraction rule, is that it expresses a tree pattern for matching against an input Logical Form. In general, a frame extraction rule has two main parts:

1) a conditional part that specifies the conditions under which the rule can match a node or nodes of an input Logical Form; and
2) an action part that specifies the action to be taken, in terms of assigning values (from a Logical Form) to a role or roles of a frame instance, if the conditional part is satisfied.

For purposes of organization, each frame extraction rule can be given a name.

A frame extraction rule can be expressed as a collection of simpler rules, each such simpler rule referred to herein as a "Logical Form rule." A Logical Form rule, like the overall frame extraction rule of which it is a part, can also have a conditional part and an action part. Logical Form rules can be of two main varieties: mandatory and optional. For a frame extraction rule to take action, all of its mandatory Logical Form rules must be satisfied. Any optional Logical Form rules, that are also satisfied when all mandatory Logical Form rules are satisfied, can specify additional action that can be taken by the frame extraction rule.

In order to further discuss frame extraction rules, in general, it will be useful to present a format for presenting such rules as pseudo-code. An example tree-structured frame extraction rule, shown in the pseudo-code, is presented in FIG. 1A. For the pseudo-coded rules presented herein, the name for the rule is provided in the first line (for the example rule of FIG. 1A, "IMPROVE_Rule" is its name).

For the pseudo-coded frame extraction rules presented herein, each line (other than the line specifying a name for the frame extraction rule) represents a Logical Form rule. Each Logical Form rule is mandatory, unless enclosed in parenthesis. For the example of FIG. 1A, each of lines 2-6 is a mandatory Logical Form rule, while line 7 is an optional Logical Form rule.

For the type of Logical Form rule presented herein, its conditional part specifies the conditions under which it is satisfied by a node "n1" of the input Logical Form while its action part specifies the role, of a frame instance, that is assigned the value "n1."

The conditional part, of a Logical Form rule, can itself be comprised of two sub-parts (both of which must be satisfied by a single node of a Logical Form):
1) a node-based sub-part, whose satisfaction depends upon the type of node to which the Logical Form rule is applied; and
2) a text-based sub-part, whose satisfaction depends upon the fragment of the input statement represented by the textual part of the node to which the Logical Form rule is applied.

For each Logical Form rule presented herein, its syntax divides it into three parts (from left to right):
<node-based sub-part>: <text-based sub-part>→<action>

As can be seen, the node-based sub-part is separated from the text-based sub-part by a colon symbol, while the text-based sub-part is separated from the action by a right-pointing arrow symbol.

The node-based sub-part can specify either of the following two conditions:
1) that a satisfactory node of the Logical Form be the root node of a sub-tree that matches the frame extraction rule, where such sub-tree is part of the Logical Form of the input statement (this condition is specified with the keyword "Root_node"); or
2) that a satisfactory node of the Logical Form be of a certain semantic constituent type.

The action specifies a role, of the frame instance created, that is assigned a value as a result of the Logical Form rule being satisfied. The value assigned to a role can comprise the textual part of the Logical Form node that satisfies the rule's node-based sub-part. Additional information, that can comprise the value assigned to a role, includes the following: if the node "n1," satisfying the node-based sub-part, is the root of a sub-tree, the textual parts of all nodes of such sub-tree can be assigned to the role. For example, if n1 is the root of a verb phrase, the entire verb phrase can be assigned to the role. Assignment of all textual parts of a sub-tree is indicated herein by enclosing the role name in square brackets.

Regarding the specification of conditions, for matching the node-based sub-part of a Logical Form rule, line 2 of FIG. 1A depicts a Logical Form rule where the node-based sub-part requires a matching node to be a sub-tree root. Each of lines 3-7 of FIG. 1A depicts a Logical Form rule where the node-based sub-part requires a node to be of a certain semantic constituent type. For example, lines 3 and 4 require semantic constituent type "Actor" while lines 5 and 6 require semantic constituent type "Undergoer."

Typically, only one Logical Form rule, of a frame extraction rule, uses a node-based sub-part that requires its matching node to serve as the sub-tree root. This Logical Form rule can be referred to as the "root Logical Form rule." The root Logical Form rule can be used as the entry point for a frame extraction rule: it can be tested, for matching against an input Logical Form, before any other Logical Form rules are tested. If the root Logical Form rule does not match, then no further Logical Form rules of the frame extraction rule need be tested.

The text-based sub-part, of a Logical Form rule, specifies a pattern of lexical units and/or features that need to appear in the textual part of a Logical Form node, even if that node already matches the node-based sub-part of the Logical Form rule. A "feature" is represented, in the pseudo-coded frame extraction rules, by any word that is entirely capitalized. The rule of FIG. 1A contains the following features: IMPROVE (appears on line 2), HUMAN (appears on lines 3 and 7), NON-HUMAN (appears on line 4), BADTHING (appears on line 5) and NON-BADTHING (appears on line 6).

A feature is defined by a set of lexical units, referred to as the feature's "defining set." A feature "f1" is regarded as satisfied, by a node "n1" of a Logical Form, where any lexical unit of f1's defining set matches the textual part of n1. Example defining sets, one for each feature utilized in the example frame extraction rules presented herein, are provided below in section 6.2 ("Features").

One type of pattern, that can be specified by the text-based sub-part, is a prepositional phrase. In particular, the text-based sub-part can specify that a preposition must be followed by a specific noun or by a feature that represents a collection of nouns. For example, the text-based sub-part of line 7 of FIG. 1A requires that the preposition "for" or "in" be followed by a noun that satisfies the feature HUMAN. The exact syntax is: Prep(for|in) . . . HUMAN.

The tree structure, specified by a pseudo-coded frame extraction rule, can be indicated by the indentation of its Logical Form rules and by the use, or non-use, of blank lines between such Logical Form rules. As with specifying the Logical Form itself, greater indentation of a line (i.e., further distance of a line is from the left margin) is used herein to indicate a Logical Form rule calling for a node farther from the root.

A Logical Form rule "LF1" and a Logical Form rule "LF2" specify, respectively, two nodes in a parent and child relationship when LF1 is the first Logical Form rule that is both above LF2 and LF1 has a lesser indentation than LF2. For example, in FIG. 1A, each of lines 3-6 specifies a node that is a child of the node specified by line 2. Logical Form rules "LF1" and "LF2" specify two nodes in a sibling relationship when the following conditions are satisfied:

LF1 and LF2 are at the same indentation level;
between LF1 and LF2 there is no other Logical Form rule with a lesser amount of indentation; and
LF1 and LF2 are separated by at least one blank line.

For example, in FIG. 1A, line 4 specifies a sibling to the node specified by line 5. However, line 3 does not specify a sibling to line 4 since lines 3 and 4 are not separated by a blank line.

In certain cases, multiple Logical Form rules can be combined, with an appropriate logical operator, to form one compound Logical Form rule. For example, a group of Logical Form rules can be combined by the XOR operator. In this case, when one, and only one, of the Logical Form rules is satisfied, the compound Logical Form rule is also satisfied.

For the pseudo-coded example frame extraction rules presented herein, a pair of Logical Form rules "LF1" and "LF2" are implicitly combined with an XOR operator when the following conditions are satisfied:

LF1 and LF2 are at the same indentation level;
between LF1 and LF2 there is no other Logical Form rule at a lesser level of indentation; and
there is no blank line between LF1 and LF2.

For example, in FIG. 1A, lines 3-4 form a compound Logical Form rule. Both Logical Form rules specify that a node be of semantic constituent type "Actor," but the rule of line 3 requires the node's textual part specify a HUMAN while the rule of line 4 requires the node's textual part specify a NON-HUMAN. If a node satisfies line 3 it will be assigned to the Benefactor role of a frame instance while a node satisfying line 4, instead, will be assigned to the Instrument role of a frame instance. Similarly, lines 5-6 of FIG. 1A form another compound Logical Form rule.

3.5 Example Frame-Extraction Rules and Their Application

Now that the Logical Form, frames and frame extraction rules have been presented, it will be useful to present four example frame extraction rules and their application to example input statements.

Each example frame extraction rule is an example of a category of rule, where the category is defined by the following: the type of textual pattern required by the conditional part (and even more specifically, by the text-based sub-part of the conditional part) of its root Logical Form rule. The first three example rules are "feature" type frame extraction rules because, for each such example, the conditional part (and even more specifically, the text-based sub-part) of its root Logical Form rule requires a feature. The last example rule is a "lexical unit" type frame extraction rule since the conditional part (and even more specifically, the text-based sub-part) of its root Logical Form rule requires a lexical unit.

All of the following example frame extraction rules are for extracting instances of the Benefit Frame.

As discussed above, the features utilized in the example frame extraction rules are provided with example definitions in section 6.2 ("Features").

3.5.1 Verb Feature

A "verb feature" type frame extraction rule includes a "verb feature" in the text-based sub-part of its root Logical Form rule (where a verb feature is a feature whose defining set is comprised of logical verbs). FIG. 1A, discussed above as part of presenting frame extraction rules in general, is an example of a verb feature frame extraction rule. Its root Logical Form rule (line 2) includes the verb feature IMPROVE. The rule is named (see line 1) the "IMPROVE_Rule."

As discussed above, when generally introducing the Logical Form, FIG. 1C depicts an example Logical Form to which the IMPROVE_Rule can be applied. Application of the IMPROVE_Rule to the Logical Form of FIG. 1C can proceed as follows.

Execution of the IMPROVE_Rule can begin by testing whether the root Logical Form rule is satisfied. As can be seen, the root node of the Logical Form of FIG. 1C satisfies the IMPROVE feature. Assuming the other mandatory Logical Form rules of the IMPROVE_Rule are satisfied (where execution of such other Logical Form rules is discussed below), the root Logical Form rule indicates that a Benefit Frame instance will be created (an example of which is shown in FIG. 1D) where the role "Benefit" will have the text of the verb phrase ("improves sleep apnea in women") assigned to it. As was discussed above, assignment of the verb phrase, as opposed to just the textual part of the Logical Form's root node, is indicated in the root Logical Form rule by "Benefit" being enclosed in square brackets.

The other mandatory Logical Form rules of the IMPROVE_Rule are as follows:

the compound Logical Form rule of lines 3-4; and
the compound Logical Form rule of lines 5-6.

The compound Logical Form rule of lines 3-4 has already been discussed above in section 3.4 ("Frame Extraction Rules"). As can be seen in FIG. 1C, only line 2 is of semantic constituent type "Actor" and its textual part satisfies the feature NON-HUMAN. Therefore, assuming the other mandatory Logical Form rule is satisfied, the Benefit Frame instance created will have the text fragment "weight loss" assigned to the role "Instrument."

The compound Logical Form rule of lines 5-6 is comprised of two Logical Form rules where each specifies that a node be of semantic constituent type "Undergoer," but the rule of line 5 requires the node's textual part specify a BADTHING feature while the rule of line 6 requires the node's textual part specify a NON-BADTHING. As can be seen in FIG. 1C, only line 3 is of semantic constituent type "Undergoer" and its textual part ("sleep apnea") satisfies the feature BADTHING. Since all mandatory Logical Form rules are satisfied, a Benefit Frame instance is created with roles assigned the values discussed above. In addition, because of the satisfaction of the Logical Form rule of line 5, such Benefit Frame instance has the text fragment "sleep apnea" assigned to the role "Problem."

The Logical Form of FIG. 1C also satisfies the optional rule of the IMPROVE_Rule. Specifically, line 4 of FIG. 1C satisfies line 7 of FIG. 1A. As can be seen, the textual part of line 4 is comprised of a preposition ("in") followed by a word ("women") that satisfies the feature HUMAN. Therefore, the Benefit Frame instance has the text fragment "women" assigned to the role "Beneficiary."

3.5.2 Adjective Feature

In "adjective feature" type frame extraction rules, the text-based sub-part, of its root Logical Form rule, includes an "adjective feature" (where an adjective feature is a feature whose defining set is comprised of surface adjectives). FIG. 2A is an example of an adjective feature frame extraction rule. Its root Logical Form rule (line 2) includes the adjective feature GOOD. The rule is named (see line 1) the "A_is_GOOD_for_Rule."

At the Logical Form level, verbs and adjectives can both be classified as a kind of predicate. Adjectives and verbs can both be represented by predicates since both apply to nouns. Therefore, verb feature frame extraction rules and adjective feature frame extraction rules are part of a broader class of predicate feature frame extraction rules.

Regarding adjective feature frame extraction rules in particular, a candidate for its application can be any input statement that has no role for the verb in its Logical Form representation. This lack of a Logical Form role for the verb occurs, for example, when the input statement uses a "linking verb." An example linking verb is the word "is."

FIG. 2B depicts an example input statement using the verb "is." FIG. 2C depicts an example Logical Form that can be produced from FIG. 2B. FIG. 2C depicts an example Logical Form to which the A_is_GOOD_for_Rule can be applied as follows.

Execution of the A_is_GOOD_for_Rule can begin by testing whether the root Logical Form rule is satisfied. As can be seen, the root node of the Logical Form of FIG. 2C (line 1) satisfies the GOOD feature.

The other mandatory Logical Form rules of the A_is_GOOD_for_Rule are as follows:
the compound Logical Form rule of lines 3-4 in FIG. 2A; and
the compound Logical Form rule of lines 5-8.

The compound Logical Form rule of lines 3-4 is similar to the compound Logical Form rules already discussed above. Line 4 of this compound Logical Form rule is satisfied by line 2 of FIG. 2C.

The compound Logical Form rule of lines 5-8 differs from the compound Logical Form rules already discussed by it being comprised of four Logical Form rules, where each specifies that a node be of semantic constituent type "Complement." Also, the text-based sub-part, of each of the four Logical Form rules, requires a prepositional phrase. Line 8 of this compound Logical Form rule is satisfied by line 3 of FIG. 2C.

The optional rule of FIG. 2A, line 9, is satisfied by line 4 of FIG. 2C.

Since the root Logical Form rule and the mandatory logical form rules are satisfied, a Benefit Frame instance is produced, as is depicted in FIG. 2D.

3.5.3 Noun Feature

In "noun feature" type frame extraction rules, the text-based sub-part, of its root Logical Form rule, includes a "noun feature" (where a noun feature is a feature whose defining set is comprised of surface nouns). FIG. 3A is an example of a noun feature frame extraction rule. Its root Logical Form rule (line 2) includes the noun feature GOODTHING. The rule is named (see line 1) the "GOODTHING_Cause_Rule."

A noun feature frame extraction rule is an example of a type of frame extraction rule that matches on the production of a Cause-Effect pattern in the Logical Form. A Cause-Effect pattern describes the state of something good being reached as a result of some Benefactor or Instrument.

For the rule to apply, the Cause of the noun GOODTHING must map to one (and to only one) of the following roles: Benefactor for a HUMAN Cause or Instrument for a NON-HUMAN Cause. Implicitly, if a Cause is identified, the noun represented by GOODTHING is known to represent a good Effect and is therefore mapped to the Gain role.

While the example rule matches for an Effect node as the parent relative to a Cause node, this dependency direction, between Cause and Effect, is arbitrary. An equivalent system could be implemented where Cause is the parent relative to the Effect.

FIG. 3B depicts an example input statement using the GOODTHING noun "health." FIG. 3C depicts an example Logical Form that can be produced from FIG. 3B. FIG. 3C depicts an example Logical Form to which the GOODTHING_Cause_Rule can be applied as follows.

Execution of the GOODTHING_Cause_Rule can begin by testing whether the root Logical Form rule is satisfied. As can be seen, the root node of the Logical Form of FIG. 3C (line 1) satisfies the GOODTHING feature.

The other mandatory Logical Form rule of the GOODTHING_Cause_Rule is the compound Logical Form rule of lines 3-4. The Logical Form rule of line 4 is satisfied by the NON-HUMAN Cause of "exercise" (FIG. 3C, line 2).

The optional Logical Form rule of the GOODTHING_Cause_Rule (FIG. 3A, line 5) is satisfied by HUMAN Modifier, in prepositional phrase form, of "for everyone."

Since the root Logical Form rule and the mandatory logical form rule are satisfied, a Benefit Frame instance is produced, as is depicted in FIG. 3D.

3.5.4 Verb Lexical Unit

In "verb lexical unit" type frame extraction rules, the text-based sub-part, of its root Logical Form rule, includes a "verb lexical unit" (where the verb lexical unit is a surface verb). FIG. 4A is an example of a verb lexical unit frame extraction rule. Its root Logical Form rule (line 2) includes the verb lexical unit "benefit_from" (where benefit_from represents the compound lexical unit "benefit from"). The rule is named (see line 1) the "A_benefit_from_B_Rule."

The other mandatory Logical Form rules of the A_benefit_from_B_Rule are as follows:
the Logical Form rule of line 3; and
the Logical Form rule of line 5.

FIG. 4B depicts an example input statement and FIG. 4C depicts an example Logical Form that can be produced from FIG. 4B.

The Logical Form rule of line 3 is satisfied by the Noun Actor "women" (FIG. 4C, line 2). The Logical Form rule of line 5 is satisfied by the Noun Undergoer "xyz" (FIG. 4C, line 4).

In addition, the optional Logical Form rule of line 4 is satisfied by the BADTHING Modifier "with early stage breast cancer" (FIG. 4C, line 3).

Since the root Logical Form rule and the mandatory logical form rules are satisfied, a Benefit Frame instance is produced, as is depicted in FIG. 4D. Since "Benefit," in the root Logical Form rule, is enclosed in square brackets, the entire verb phrase (i.e., "will benefit from the new drug xyz") is assigned to the Benefit role. Regarding the value assigned to the "Problem" role, it is the same as the textual part of the matching node (of line 3, FIG. 4C), except the semantically unnecessary preposition (i.e., "with") has been removed.

4 Frame-Based Search

4.1 Implementation Approaches

Each of the above-discussed implementation approaches (section 1.1 "Frame-Based Search"), introduced generally, is now addressed in greater detail.

For each of the following five implementation approaches, the form of its search result can be described by reference to FIG. 5B (also discussed above in section 1.1 "Frame-Based Search"). If a search result need only be output to a user, it can be comprised of the records of search result 510. If the search result is to be further analyzed (and, in particular, is to be analyzed by a frame-based approach as discussed below in section 5), it can also comprise frame instances 520.

4.1.1 First Approach

FIG. 6A depicts the first approach to "match-by-match" search, of the target content, according to a frame-based query. A user query, comprised of both a frame-based query and a non-frame-based query, is accepted. Step 601. A next match, of the frame-based query, is sought for in the target content. Step 602. If a next match is found, a locality to such match is determined. "Yes" path of step 603 and step 604. If the locality also matches the non-frame-based query ("yes" path of step 605) then a record is added to the search result (step 606). Alternatively, if the locality does not match the non-frame-based query ("no" path of step 605) then a next match, of the frame-based query, is sought for in the target content (602). Once a next match of the frame-based query cannot be found ("no" path of step 603), the search result is either further analyzed or is output to the user (step 607).

4.1.2 Second Approach

FIG. 6B depicts the second approach to "match-by-match" search, of the target content, according to a non-frame-based query. As can be seen, FIG. 6B is the same as FIG. 6A, except that the non-frame-based query is used (in steps 602-604) to determine a locality and such locality, when found, is matched against a frame-based query (step 605).

4.1.3 Third Approach

FIGS. 7A and 7B depict the third approach, which is comprised of two phases.

The first phase (shown in FIG. 7A as the "Indexing Phase") is to create a frame-based database (or FBDB) from the target content. An FBDB is produced as follows. A next UNLD, of the target content, is sought. Step 701. If a next UNLD is found ("yes" path of step 702), such UNLD is tested for whether it is indicative of a frame (step 703). If it is indicative of a frame ("yes" path of step 703), a locality, to the matching of the frame, is determined (step 704). Next, the locality is indexed for searching and added to the FBDB. Step 705. Such indexing can include role information so that a search of the FBDB can be limited to searching text that has been identified with a particular role or roles.

If a next UNLD is not found ("no" path of step 702), the indexing phase can end. If a next UNLD is found, but is not indicative of a frame ("no" path of step 703), a next UNLD, of the target content, is sought. Step 701.

A suitable FBDB for technology scouting is one where the organizing frame is called the Benefit Frame. In this case, the FBDB can be referred to by the notation FBDB(Benefit).

The second phase (shown in FIG. 7B as the "Search Phase") searches the FBDB created by the first phase. An input query is accepted from the user. Step 711. The FBDB can be searched according to a non-frame-based query. Step 712. Alternatively, or in addition, if role-specific information has been made part of the index, the user query can also include a role-specific frame-based query. Step 712. Even when the user query only specifies a non-frame-based query (in step 712), there is still an implicit frame-based query since the FBDB was created based upon whether a frame is invoked.

Once a search result has been produced, it is either further analyzed or is output to the user. Step 713.

4.1.4 Fourth Approach

Figure 8:
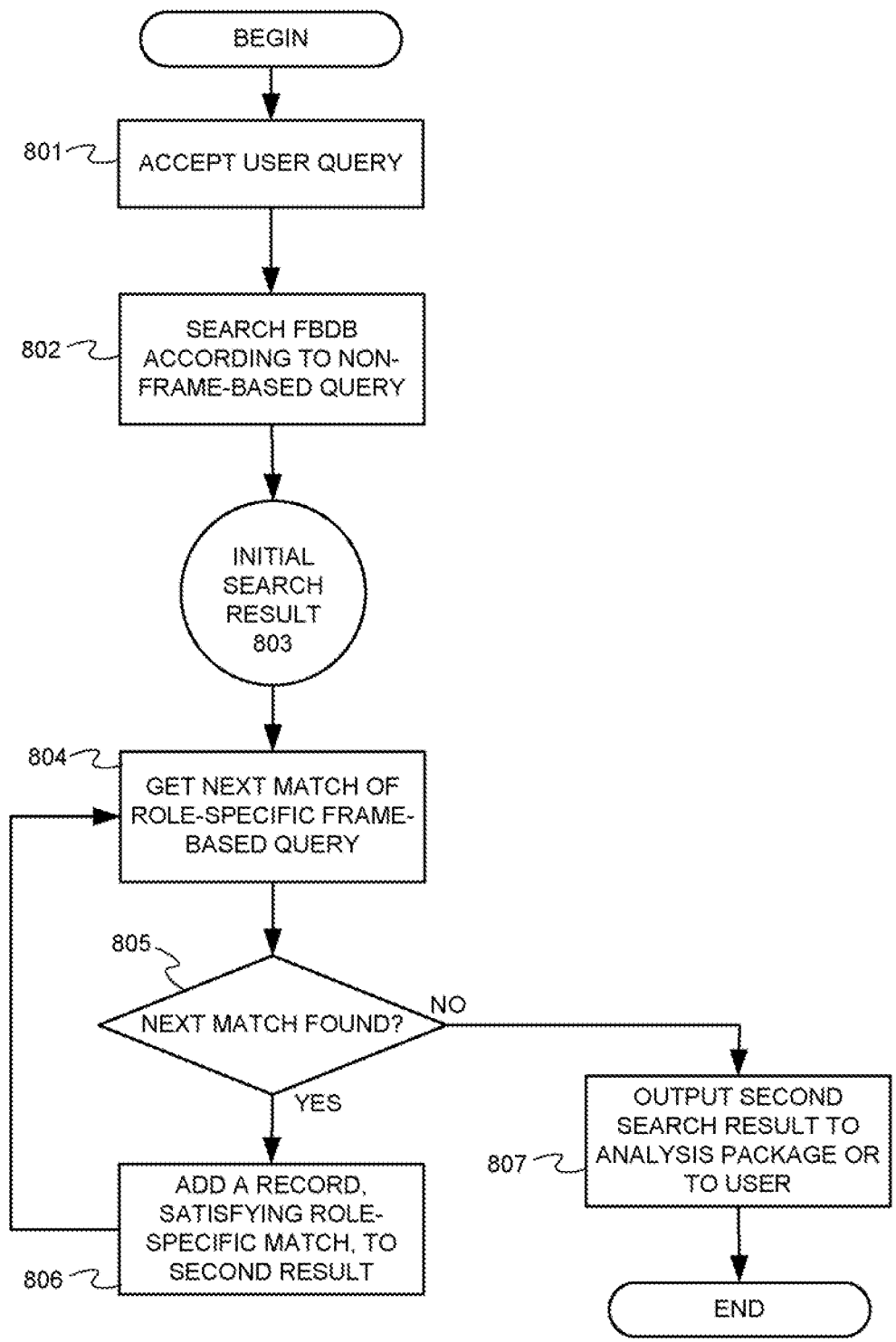
FIG. 8 shows searching an FBDB to produce an initial result and searching the initial result with a role-specific query.

FIG. 8 depicts a fourth approach. It assumes an FBDB has already been produced, in accordance with the indexing phase of the third approach (FIG. 7A). In FIG. 8, after a user query has been accepted (step 801), the FBDB is first searched (step 802), according to the non-frame-based query, to produce an initial search result (depicted by 803). The initial search result is itself searched (step 804) for a next match of a role-specific frame-based query. If a next match is found ("yes" path of step 805), the matching record of the initial search result is added to a second search result (step 806). When a next match is no longer found ("no" path of step 805), the second search result is either further analyzed or presented to the user (step 807).

The non-frame-based query (of step 802) can be derived from the role-specific frame-based query (of step 804). In this way an initial, broader search can be performed on the user's role-specific frame-based query to produce an initial search result 803. The number of records included in the initial search result can be limited to be below a particular upper limit number. Once an initial search result has been produced, a subset of such records can be found by using the role-specific information of the user's query. Thus, in step 804, an instance of the relevant frame can be determined for each record of initial search result 803. Referring back to FIG. 5B (discussed above in section 1.1 "Frame-Based Search"), initial search result 803 can be comprised of the records of search result 510, while step 804 can add the frame instances 520.

4.1.5 Fifth Approach

Figure 9:
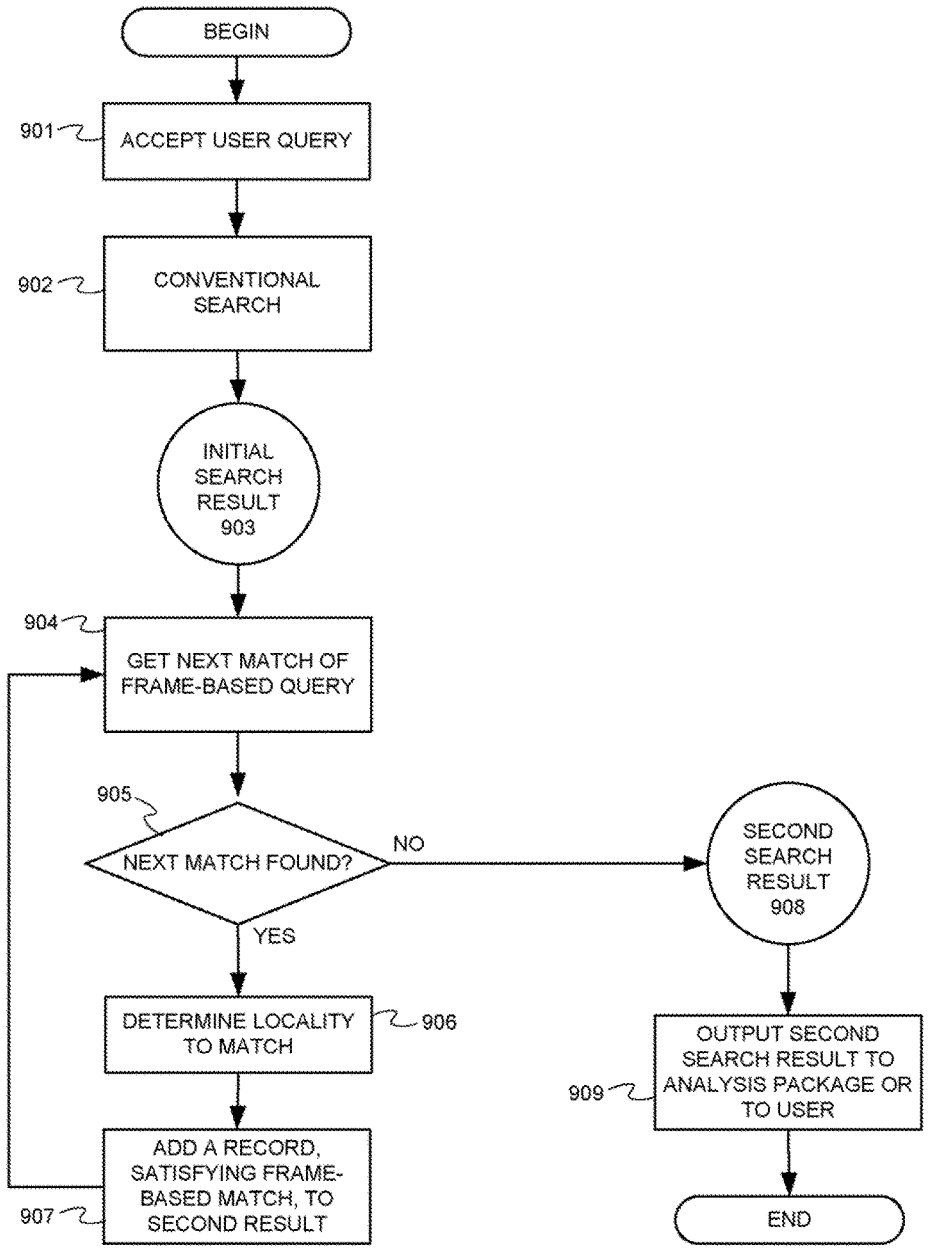
FIG. 9 shows producing a conventional initial result and searching the initial result with a frame-based query.

FIG. 9 depicts a fifth approach. After a user query has been accepted (step 901) a conventional search is performed (step 902) to produce an initial search result (depicted as 903). An example conventional initial search result can be produced with GOOGLE. The initial search result is itself searched (step 904) for a next match of a frame-based query (where the frame-based query can be role-specific or it need only test whether a frame has been invoked). If a next match is found ("yes" path of step 905), a locality to the match is determined (step 906). The determined locality, itself a kind of record, is added to a second (and output) search result (step 907). When a next match is no longer found ("no" path of step 905), the second search result 908 has been produced. The second search result is either further analyzed or presented to the user (step 909).

4.2 By Benefit Frame

4.2.1 Search Types

Any of the above-described implementation approaches can be used in conjunction with the Benefit Frame. As discussed above, when performing a technology scouting search, the Benefit Frame can be useful since, in general, it is reasonable to assume that something that provides some kind of benefit is regarded as doing so because it addresses some kind of problem. For technology scouting, the target content can be comprised of a large portion of the Internet-accessible content (such as web pages or documents) that is technologically oriented. The target content can also include any other sources of information useful to finding the particular technology sought.

While role-specific frame-based queries were discussed, in general, above (section 1.1 "Frame-Based Search"), this section discusses several specific types of queries that can be useful in conjunction with the Benefit Frame.

A first type of role-specific search, that can be preformed with the Benefit Frame, can be referred to as a "Problem Search." In a Problem Search, a role-specific query "RSQ1" can comprise lexical units associated with the problem "P1" that the user (e.g., XYZ, Inc. as discussed above in the example of section 2.1 "Of Frame-Based Search") is trying to solve by technology scouting for an existing technology "ET1." RSQ1 is used to search within the Problem role of the Benefit Frame instances identified. If an RSQ1 matches, within the Problem role of a Benefit Frame instance "BFI1," it is reasonable to assume that the contents of the Instrument and/or Benefactor roles, of BFI1, may describe a relevant solution (i.e., may describe and/or relate-to an ET1) to P1.

A second type of role-specific search, that can be useful for technology scouting, can be referred to as a "Benefit Search." A Benefit Search makes use of the fact that a user may know a set of characteristics "CS1" for an acceptable solution, but does not yet know actual existing technologies that have such characteristics. RSQ1 can comprise lexical units associated with "CS1." If an RSQ1 matches, within the Benefit or Gain roles of a Benefit Frame instance "BFI1," it is reasonable to assume that the contents of the Instrument and/or Benefactor roles, of BFI1, may describe a solution (i.e., may describe and/or relate-to an ET1) that has the characteristics of CS1.

If a characteristic is expressed, for an RSQ1, with a verb, it is more likely to match within the Benefit role of a Benefit Frame instance. Example characteristics, expressed with a verb, are as follows: enhance bone density or decrease blood pressure. Alternatively, if just a characteristic itself is described (as a noun), it is more likely to match within the Gain role of a Benefit Frame instance. Example characteristics, expressed in noun form, are as follows: bone density or blood pressure.

A third type of search can be called a "Topic Search." A Topic Search is a keyword search of the locality where each Frame Instance occurs. A Topic Search can be combined with either a Problem or Benefit Search. Compared to a Problem or Benefit Search, a Topic Search tends to have a higher likelihood of finding matches (since it searches more information than that which is limited to specific roles) but each match has a lower probability of satisfying the user's search goals.

Therefore, a Topic Search can be utilized where a sufficient number of matches, for a particular technology scouting need, are not produced with a Problem or Benefit Search.

Topic Search can be combined with Problem or Benefit Search when the scope of anaphora resolution, during frame extraction, is insufficient for a purely role-based query.

4.2.2 Example Searches

This section addresses example technology scouting searches that can be performed by an example technology scouting system. For the example technology scouting system, it is assumed that the UNLD, within which instances of the Benefit Frame are sought, is the sentence. The target snippet size (which can vary, as is described below in section 6.1 "Snippet Formation") is five sentences (i.e., two sentences before the focus sentence and two sentences after the focus sentence).

FIG. 10 depicts an example screen 1000 with graphical user interface by which to enter search queries for the purpose of technology scouting. A user query is entered into query box 1010 and a search initiated by selecting search button 1011. Example screen 1000 also includes an instructions box 1012, with some abbreviated help instructions on how a user may form a suitable query for entry in query box 1010.

4.2.2.1 Problem Search

FIG. 11A depicts the same example screen 1000 of FIG. 10, except a Problem Search has been entered in query box 1010. The role-specific query, of query box 1010, is comprised of the search terms "skin" and "cancer." As can be seen, the search terms are prefixed with "problem:", a prefix that indicates a Problem Search is to be performed. Thus, the technology scouting system will search for Benefit Frame instances where, in the Problem role, the following words (and a certain range of variation upon the following words) appear: "skin" and "cancer."

FIG. 12A depicts four example snippets (1210-1213) that can comprise part of the search result produced in response to the Problem Search of FIG. 11A. An explanation, of why snippets 1210-1213 are appropriate for inclusion in the search result, is as follows.

For each of snippets 1210-1213, the focus sentence is underlined and its source (from an Internet-accessible location) is shown. FIG. 14A depicts snippets 1210-1213 as a search result 1200. In FIG. 14A, only the focus sentence, of each snippet of FIG. 12A, is shown. For each snippet of FIG. 14A, a corresponding Benefit Frame instance is shown. Benefit Frame instances 1401-1403 comprise a frame-based analysis 1400. Each of instances 1401-1403 is determined from the focus sentence of its corresponding snippet 1210-1213. The Benefit Frame instances of FIG. 14A show only the following three roles of the Benefit Frame: Problem, Benefactor and Instrument. As can be seen, each Problem role of FIG. 14A includes the words "skin" and "cancer."

4.2.2.2 Benefit Search

FIG. 11B depicts the same example screen 1000 of FIG. 10, except a Benefit Search has been entered in query box 1010. The role-specific query, of query box 1010, is comprised of the following search terms: "preventing," "skin" and "cancer." As can be seen, the search terms are prefixed with "benefit:", a prefix that indicates a Benefit Search is to be performed. Thus, the technology scouting system will search for Benefit Frame instances where, in the Benefit or Gain roles, the following words (and a certain range of variation upon the following words) appear: "preventing," "skin" and "cancer."

FIG. 12B depicts four example snippets (1220-1223) that can comprise part of the search result produced in response to the Benefit Search of FIG. 11B. An explanation, of why snippets 1220-1223 are appropriate for inclusion in the search result, is as follows.

For each of snippets 1220-1223, the focus sentence is underlined and its source (from an Internet-accessible location) is shown. FIG. 14B depicts snippets 1220-1223 as a search result 1201. In FIG. 14B, only the focus sentence, of each snippet of FIG. 12B, is shown. For each snippet of FIG.

14B, a corresponding Benefit Frame instance is shown. Benefit Frame instances 1411-1413 comprise a frame-based analysis 1410. Each of instances 1411-1413 is determined from the focus sentence of its corresponding snippet 1220-1223. The Benefit Frame instances of FIG. 14B show only the following three roles of the Benefit Frame: Benefit, Benefactor and Instrument. As can be seen, each Benefit role of FIG. 14B includes the following words (or includes words that are within a certain range of variation upon each of the following words): "skin," "cancer" and "preventing."

5 Frame-Based Analysis of Search Results

5.1 Role-Value Oriented Search Results

In this section it is assumed that a search result SR1 (such as that of FIG. 5B), comprised of snippets and corresponding frame instances, has already been produced. Such search result can be produced by any frame-based search method, or it can be produced from the result of any conventional search method.

If the search result has been produced by a conventional search method, the search result can be processed, in accordance with the fifth implementation approach discussed above (see section 4.1.5 "Fifth Approach" and FIG. 9), to produce a search result comprised of snippet records, with each snippet record having a corresponding frame instance. In particular, FIG. 9 discloses a method for converting an initial conventional search result 903 into a second search result 908 that is comprised of snippets and corresponding frame instances. The same procedure as discussed in section 4.1.5 with respect to FIG. 9 can be used, except that only an implicit frame-based query need be applied in step 904.

As discussed above, the frame, by which SR1 is to be analyzed, can have its roles divided into two groups: $R1_{input}$ (or its "input roles") and $R1_{output}$ (also known as its "output roles"). For the above-discussed Problem Search, the set of input roles, for the Benefit Frame, is comprised of the Problem role. The Benefit Search has its input roles comprised of the Benefit and Gain roles. For each of the Problem, Benefit and Topic searches, when used in conjunction with technology scouting, its set of output roles can be comprised of the Instrument and Benefactor roles. This is because the Instrument and Benefactor roles are likely, in general, to provide information on the technology or technology provider by which the Problem, of a Benefit Frame instance, is addressed.

Rather than being presented to the user in a record-oriented format, a search result SR1 can be presented to the user organized according to the values that appear in the output roles.

Figure 16A:
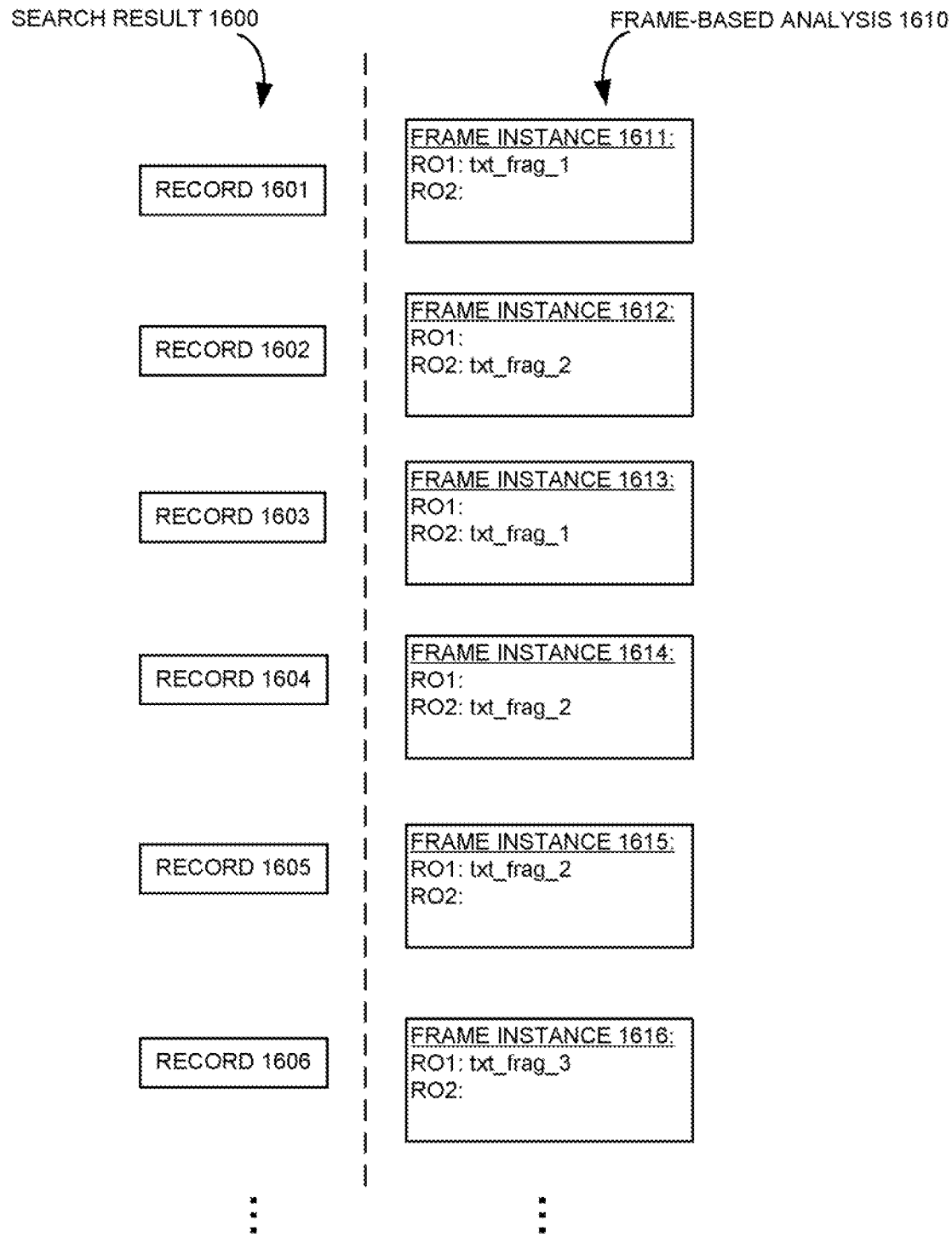
FIG. 16A presents a generic record-oriented search result with corresponding instances.

FIG. 16A depicts a generic record-oriented search result 1600, comprised of records 1601-1606. For each of records 1601-1606 a corresponding frame instance 1611-1616 has been determined. Each frame instance depicts only the following two roles, both of which are members of the set of output roles: RO1 and RO2. In general, however, frame instances 1611-1616 can include roles that are members of $R1_{input}$ as well as other roles that are members of $R1_{output}$.

For each of frame instances 1611-1616, a text fragment has been assigned to either RO1 or RO2. Such text fragment is understood to appear in the corresponding record (of search result 1600) and is representative, in such corresponding record, of the role to which it is assigned. For example, in the case of technology scouting as discussed above in this section, RO1 and RO2 can represent the Instrument and Benefactor roles. In this case, a value for either of RO1 or RO2 represents potentially useful information.

Figure 17A:
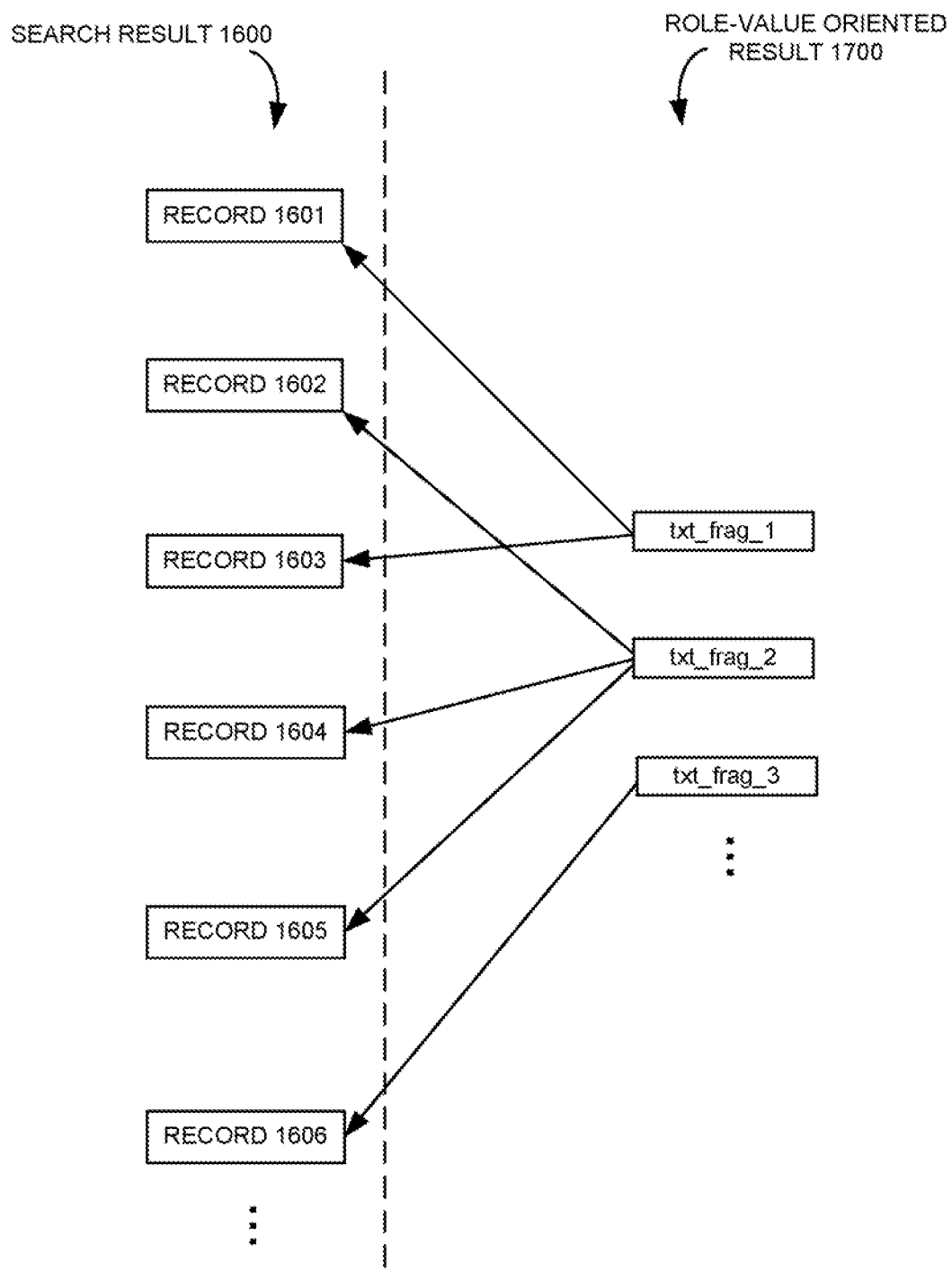
FIG. 17A presents a role-value oriented search result.

FIG. 17A depicts a role-value oriented search result 1700, that is determined from frame-based analysis 1610 of FIG. 16A. As can be seen, the role-value oriented search result 1700 is comprised of the values assigned to output roles of a frame-based analysis 1610. In particular, frame-based analysis 1610 identified three unique values for assignment to the output roles: txt_frag_1, txt_frag_2 and txt_frag_3. In role-value oriented search result 1700, each of these three values points (or is otherwise linked) to the search result records from which it is derived.

Figure 18:
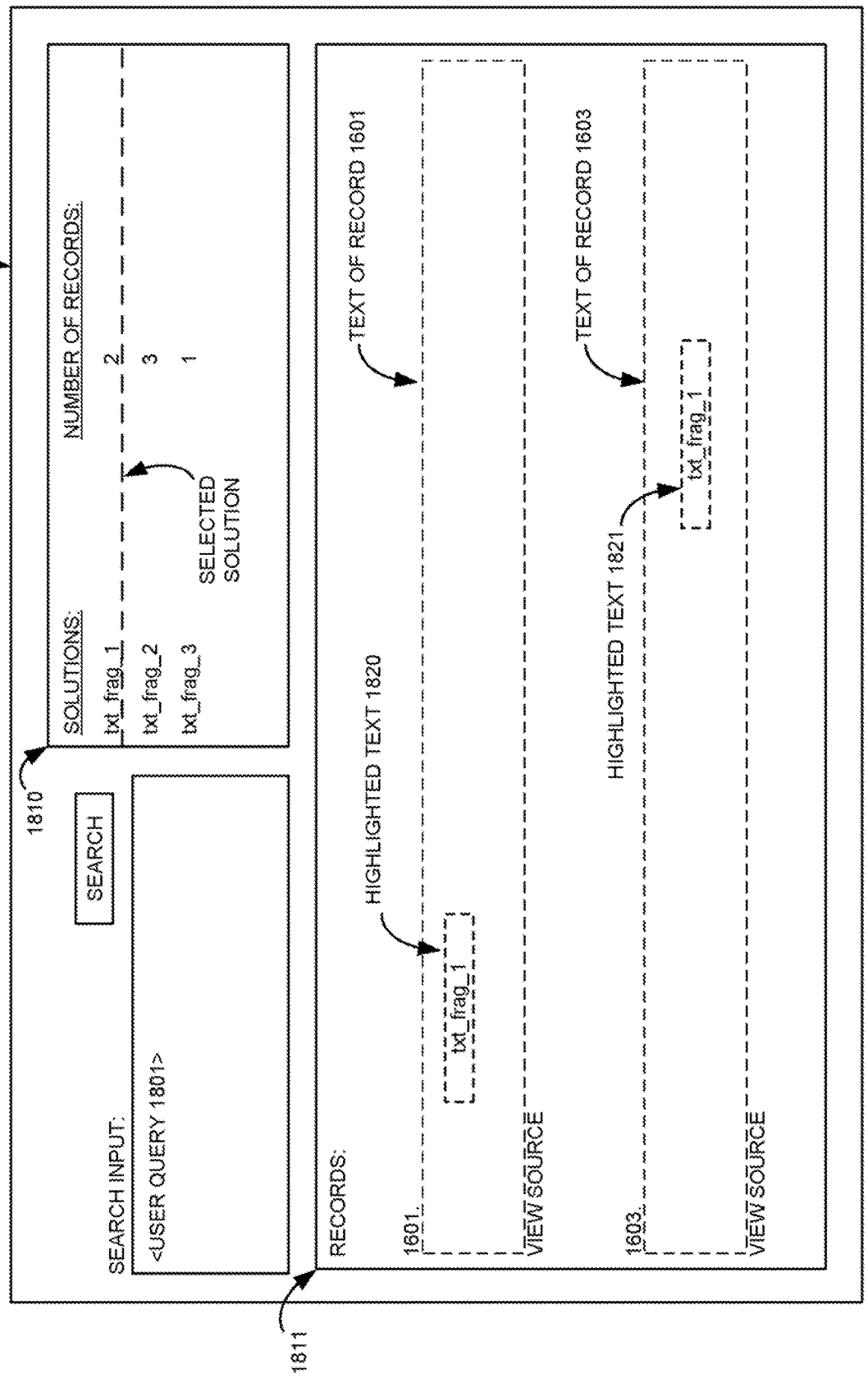
FIG. 18 presents an example screen display of a role-value oriented search result.

FIG. 18 depicts a role-value oriented search result displayed on a computer screen 1800. As with screen 1000 of FIG. 10, that depicts a screen for the input of a user query, screen 1800 also has a query entry box (indicated by numeral 1010 in FIG. 10) and a search button (indicated by numeral 1011 in FIG. 10). Within the query entry box of screen 1800, a user query 1801 has been entered. Instead of search instructions 1012 of FIG. 10, however, screen 1800 has a role-value oriented search result box 1810 and a records display box 1811. FIG. 18 depicts the particular role-value oriented search result of FIG. 17A.

Role-value oriented search result box 1810 depicts the three text fragments shown in role-value oriented search result 1700 of FIG. 17A. Each of these text fragments is depicted, in box 1810, under the column "SOLUTIONS," since each may contain information useful to solving the problem of the user's technology scouting search. The column "NUMBER OF RECORDS" depicts the number of records, of search result 1600, that each text fragment is associated with through FIG. 17A. Of the three text fragments displayed in box 1810, txt_frag_1 has been selected for further enquiry (indicated by the dashed line just below this text fragment).

Since txt_frag_1 has been selected, records display box 1811 shows the two records (1601 and 1603) associated with this text fragment. For each record, display box 1811 shows the text of the record (indicated in FIG. 18 by a dashed-outline box) as well as a link (shown as "VIEW SOURCE") by which the user can see the source document for such record. Such link can comprise an Internet-accessible location, as discussed above with respect to FIGS. 12A and 12B. Within the display of the text of each record, in display box 1811, the output role text fragment (selected in search result box 1810) can be highlighted or otherwise emphasized. In this way, information sought by the user is displayed in context. Such emphasized text is indicated, in display box 1811, by numerals 1820 and 1821. This is in contrast to conventional search systems, in which the text matching the user's query is what is typically displayed in the context of the matching records. If useful, however, the text of matching records can be displayed with emphasis upon any combination of the following types of text: text that matches the user's query and text that is representative of output roles.

5.2 Role-Value Merging

While a role-value oriented search can be a very efficient form, of search-result presentation, further efficiencies are possible. In particular, role-values having the same (or very similar) meaning, but differing syntax, can be merged. Role-values determined sufficiently similar, for purposes of merging, shall be referred to herein as "equivalent."

Such merging can be accomplished as follows. Assume a frame-based analysis has produced a set "UVS" of unique values assigned to the output roles of a search result SR1. For each element, $UVS_i$, of UVS, a semantic parser can be applied and a Logical Form produced. The set of Logical Forms produced, "LFS," has a corresponding Logical Form for each member of UVS. For any two members $UVS_x$ and $UVS_y$, of UVS, they can be merged if their corresponding Logical Forms, $LFS_x$ and $LFS_y$, are equivalent. If the two Logical Forms are determined equivalent, a decision then needs to be made regarding what single value will represent the role values $UVS_x$ and $UVS_y$, in the role-value oriented search result. Since their meanings have been determined equivalent, either $UVS_x$ or $UVS_y$ can be chosen. Another possibility is to determine a new value representing the commonality between role-values $UVS_x$ and $UVS_y$.

Figure 17B:
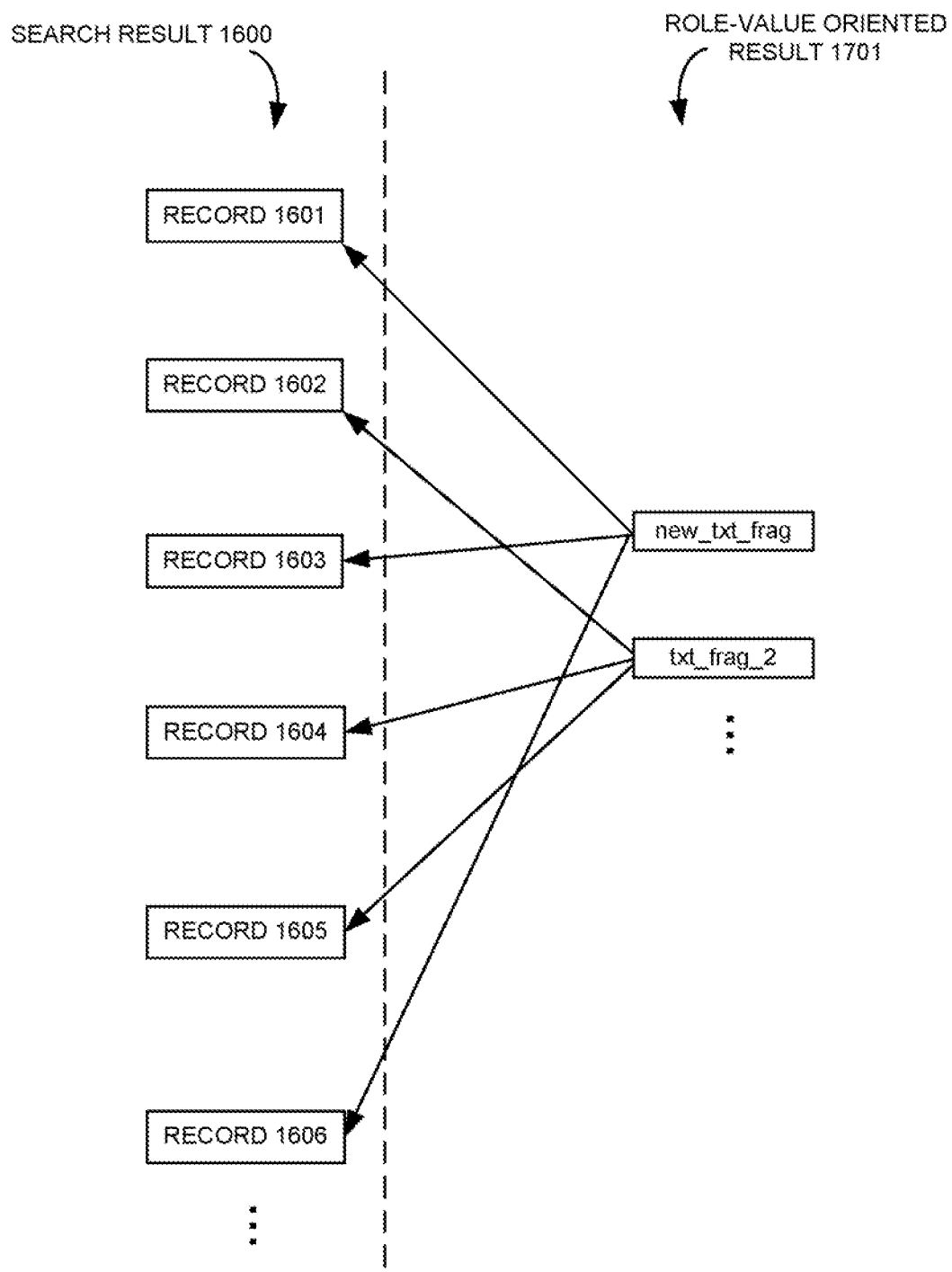
FIG. 17B presents a role-value oriented search result with merging.

The effect of role-value merging on the efficiency, with which a user can review a search result, is shown in FIG. 17B. FIG. 17B is the same as FIG. 17A, except that the Logical Form for txt_frag_1 has been found to be equivalent to the Logical Form for txt_frag_3. A new value, new_txt_frag, has been determined that represents the commonality between txt_frag_1 and txt_frag_3. Because new_txt_frag represents the records in which either txt_frag_1 or txt_frag_3 appears, new_txt_frag is shown as pointing to records 1601, 1603 and 1606. The result is that the portion of the role-value oriented search result shown in FIG. 17B (indicated as 1701) contains only two role values for review by a user, while the role-value oriented search result of FIG. 17A (indicated as 1700) has three.

Determination of equivalence, between two Logical Forms $LFS_x$ and $LFS_y$, can be accomplished as follows.

First, a determination can be made as to whether the Logical Forms are structurally similar. For example, $LFS_x$ and $LFS_y$ can be regarded as structurally similar if their topologies (of nodes and links), ignoring any values that may be attached to such nodes or links, are the same. Such structural comparison can be limited to certain portions of their topologies. For example, if $LFS_x$ and $LFS_y$ represent tree structures, such topological comparison can be limited to a comparison of the root node and its direct child nodes.

In addition to a topological comparison, structural comparison can comprise comparing, between corresponding nodes, the types of some of the values assigned to each node. For example, it can be determined whether each root node, of both $LFS_x$ and $LFS_y$, represents a logical verb. Regarding the non-root nodes, it can be determined whether each root node, of a corresponding pair drawn from $LFS_x$ and $LFS_y$, represents the same type of semantic constituent. For example, it can be determined whether each node, of a pair of corresponding nodes drawn from $LFS_x$ and $LFS_y$, represents an "Undergoer."

If the structural comparison is determined successful, for each pair of corresponding nodes drawn from $LFS_x$ and $LFS_y$, the textual part can be compared. If the textual parts, of a corresponding pair of nodes, are not identical, any of a variety of techniques, generally referred to herein as "synonym matching," can be used to determine whether the textual parts are sufficiently similar. For a pair of corresponding nodes, drawn from $LFS_x$ and $LFS_y$, let us refer to their textual parts as $TP_x$ and $TP_y$. Further, let us refer to a pair of corresponding lexical units, drawn from $TP_x$ and $TP_y$, as $LU_x$ and $LU_y$. If $LU_x$ and $LU_y$ are not identical, the following are some synonym matching techniques that can be used. If $LU_x$ and $LU_y$ share a common stem (also referred to as "stemming"), they can be regarded as matching. If $LU_x$ and $LU_y$ are synonyms, they can be regarded as matching. If $LU_x$ is a verb and $LU_y$ is a deverbial noun form of $LU_x$, they can be regarded as matching.

5.3 Examples

In this section, example role-value oriented search results, made more efficient through merging, are presented.

5.3.1 First Example

FIG. 16B shows a frame-based analysis 1620 that is the same as the generic frame-based analysis 1610 of FIG. 16A, except each of the three generic types of text fragments presented in FIG. 16A is replaced with an example text fragment in FIG. 16B. The frame instances of FIG. 16B are numbered 1621-1626. Without merging, a role-value oriented search result, that includes frame-based analysis 1620, would include as separate "solutions" (in a role-value oriented search result box, such as 1810 of FIG. 18) all of the following text fragments: "weight loss," "losing weight" and "weight reduction." The merging process, applied to frame-based analysis 1620, permits only one of these three text fragments (or a single generalization of the three text fragments) to be displayed. Such merging process can operate as follows.

Figure 19A:
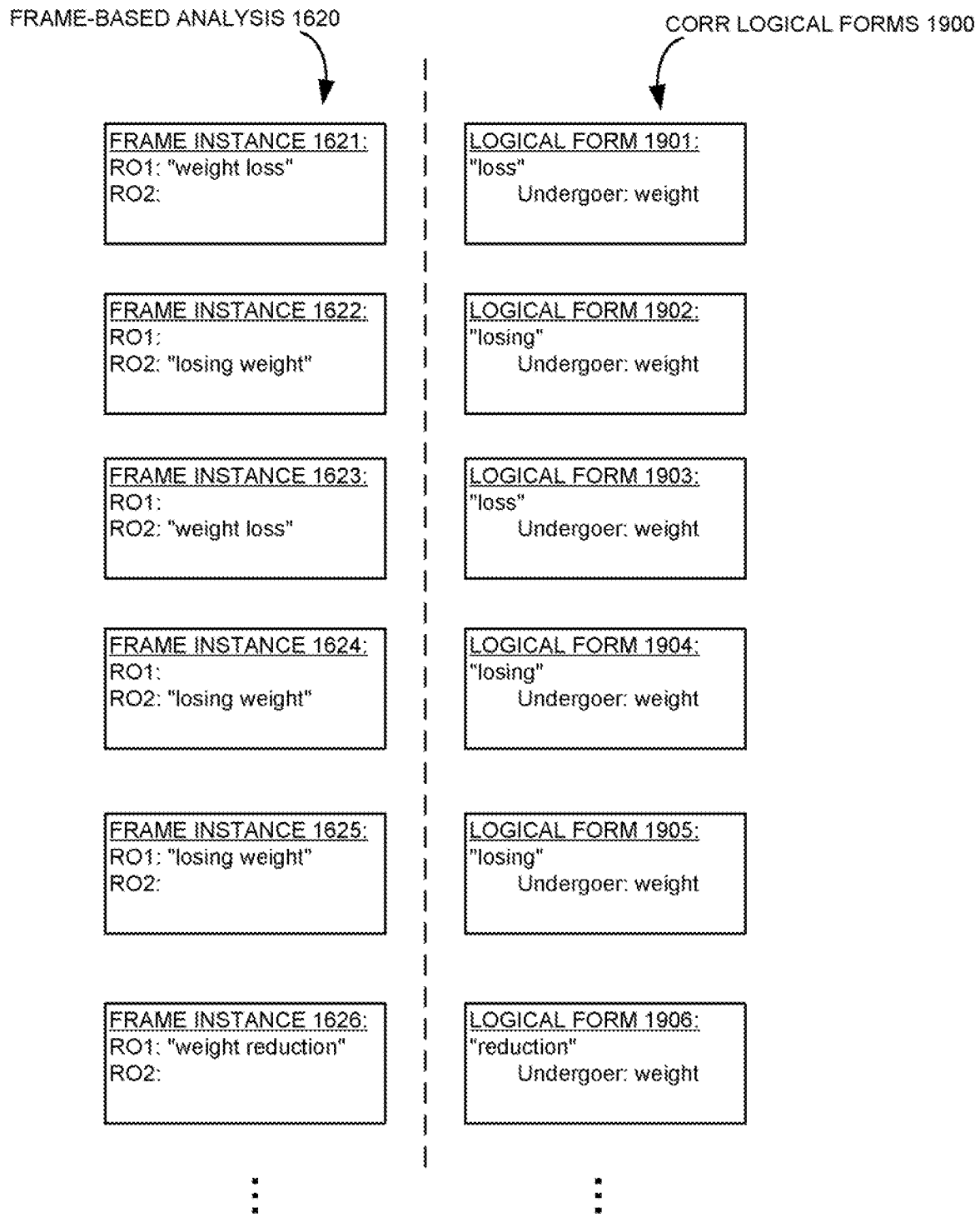
FIG. 19A presents example frame instances of a search result, each with an example corresponding Logical Form.

FIG. 19A depicts the example frame-based analysis 1620, with a Logical Form determined from, and paired with, each frame instance. The corresponding logical forms 1900 are numbered 1901-1906. For example, Logical Form 1903 can be determined by applying a semantic parser to "weight loss" (the value for role RO2 of frame instance 1623).

All Logical Forms 1901-1906 can be determined equivalent, at least from a structural perspective, as follows. Topologically, Logical Forms 1901-1906 are the same since each is comprised of just a root node and one child node. Also, between each pair of corresponding nodes, there are the same types of values. Specifically, every root node, of Logical Forms 1901-1906, is a logical verb (either "loss," "loosing" or "reduction"). Also, each child node, of Logical Forms 1901-1906, is a semantic constituent of type "Undergoer."

While structural comparison is positive, for Logical Forms 1901-1906, the textual parts are not identical across all pairs of corresponding nodes. The techniques of synonym matching, however, can be used as follows to find equivalence between all Logical Forms 1901-1906.

First, it can be seen that the differences between Logical Forms 1901-1906 are only with regard to their root nodes (since every child node has "weight" as its textual part). With regarding to combining all the root nodes, the stemming technique can be used to determine a common lexical-unit stem (e.g., "lose") to represent both "loss" (of Logical Forms 1901 and 1903) and "losing" (of Logical Forms 1902, 1904 and 1905). Also, "loss" is a deverbial noun form of "losing." In these ways, the root nodes of Logical Forms 1901-1905 are shown mergable. The root node of Logical Form 1906 is mergable with the roots nodes of 1901-1905 for at least the reason that "loss" is a synonym for "reduction."

5.3.2 Second Example

FIG. 19B shows another example frame-based analysis 1630. Example frame-based analysis 1630 is the same as example frame-based analysis 1620 (of FIG. 19A), except that three different text fragments appear among frame instances 1631-1636. The text fragments of frame-based analysis 1630 are similar to the text fragments (appearing in the Benefactor or Instrument roles) of frame-based analysis 1400 (of FIG. 14A). As can be seen, the text fragments of analysis 1630 and the text fragments of analysis 1400 both address the wearing of hats. FIG. 19B depicts, for each of frame instances 1631-1636, a corresponding Logical Form 1911-1916. Each Logical Form is determined from the text fragment of its corresponding frame instance.

As was discussed above, structural comparison of Logical Forms can be limited to certain portions of their topologies. More specifically, for Logical Forms represented as tree structures, such topological comparison can be limited to a comparison of the root node and its direct child nodes. If such a limitation (to the root and its direct children) is applied to FIG. 19B, it can be seen that all Logical Forms 1911-1916 will be found equivalent to each other.

5.3.3 Problem Search

Returning to the example Problem Search of section 4.2.2.1 ("Problem Search"), where solutions for "skin cancer" are sought in FIG. 11A and representative responsive snippets are presented in FIG. 12A, a role-value oriented display of such search results is shown in FIG. 15A. FIG. 15A shows a screen 1500 that has the same organization discussed more generically with regard to FIG. 18.

In particular, in the role-value oriented search result box 1510, each of the text fragments shown under the column "SOLUTIONS" may contain information useful to addressing the problem of "skin cancer." As indicated by the dashed line, the text fragment "wear hat" has been selected for further enquiry. In records display box 1511 of FIG. 15A is shown the text of three of snippets from which, as part of a merging process, the value "wear hat" has been generalized. The three snippets shown in FIG. 15A correspond to snippets 1210-1212 of FIG. 12A. For each of the three snippets shown in FIG. 15A, its text that corresponds to "wear hat" has been emphasized (in the particular example of FIG. 15A, such emphasis is shown by underlining).

FIG. 14A, also discussed above in section 4.2.2.1 ("Problem Search"), shows an example frame-based analysis 1400 (discussed, above, more generically in FIG. 16A) that comprises part of the basis for inclusion of "wear hat" in the role-value oriented display of search results in FIG. 15A. Using the above-discussed merging techniques, the particular role values of frame-based analysis 1400 (for the Instrument and Benefactor roles) can be merged and represented by the single generalized text fragment "wear hat."

5.3.4 Benefit Search

Returning to the example Benefit Search of section 4.2.2.2 ("Benefit Search"), where solutions with the benefit of "preventing skin cancer" are sought in FIG. 11B and representative responsive snippets are presented in FIG. 12B, a role-value oriented display of such search results is shown in FIG. 15B. FIG. 15B shows a screen 1520 that has the same organization discussed more generically with regard to FIG. 18.

In particular, in the role-value oriented search result box 1521, each of the text fragments shown under the column "SOLUTIONS" may contain information useful to attaining the benefit of "preventing skin cancer." As indicated by the dashed line, the text fragment "wear hat" has been selected for further enquiry. In records display box 1522 of FIG. 15B is shown the text of three of snippets from which, as part of a merging process, the value "wear hat" has been generalized. The three snippets shown in FIG. 15B correspond to snippets 1220-1222 of FIG. 12B. For each of the three snippets shown in FIG. 15B, its text that corresponds to "wear hat" has been emphasized (in the particular example of FIG. 15B, such emphasis is shown by underlining).

FIG. 14B, also discussed above in section 4.2.2.2 ("Benefit Search"), shows an example frame-based analysis 1410 (discussed, above, more generically with respect to FIG. 16A) that comprises part of the basis for inclusion of "wear hat" in the role-value oriented display of search results in FIG. 15B. Using the above-discussed merging techniques, the particular role values of frame-based analysis 1410 (for the Instrument and Benefactor roles) can be merged and represented by the single generalized text fragment "wear hat."

6 Further Details

6.1 Snippet Formation

As discussed above, a snippet refers to the locality around the match of a frame to a location in computer-accessible content. More specifically, if a match of a frame has occurred in a UNLD "UM1," the snippet comprises a copy of UM1 (also called the "focus" UNLD) and may also comprise a copy of additional, surrounding, contextual content.

Choosing an appropriate snippet size depends on several factors. First, it can depend upon the UNLD by which frame instances are identified (e.g., whether frames are identified within individual sentences or across larger units of text). Second, it can depend upon providing sufficient surrounding context for keyword searching. Third, snippet size can depend upon the amount of text necessary, for a user of a search system, such that a snippet can be read and evaluated, apart from its original source content.

A specific issue to consider, in determining snippet size, is pronoun resolution. In the context of snippet size determination, the pronoun resolution problem can be stated as follows. If a pronoun occurs in a UNLD "U1," in which a frame instance has been identified, it is desirable that the pronoun's noun appear in the snippet context that surrounds "U1." The larger the snippet size, the more likely it is that all pronouns of "U1" will be resolved. Counterbalancing pronoun resolution, however, are such factors as making a snippet small enough for fast comprehension by the searcher.

If the UNLD by which frame instances are identified is the sentence, a snippet size of five sentences has been experimentally determined as desirable. Once a frame instance has been identified in a focus sentence "S1," two sentences before S1 and two sentences after S1 can be added to the snippet to provide sufficient context for S1. While a desirable goal, depending upon the logical organization of the computer-accessible content from which snippets are being extracted, an individual snippet may comprise less than five sentences. For example, the computer-accessible content may be organized into separate documents. If S1 is at the beginning of a document, two sentences prior to S1 may not be available for addition to the snippet. Similarly, if S1 is at the end of a document, two sentences after S1 may not be available for addition to the snippet.

6.2 Features

This section presents an example defining set (i.e., a set of lexical units) for each feature utilized in the example benefit frame extraction rules presented herein. As discussed above, a "feature" is represented, in the pseudo-coded frame extraction rules, by any word that is entirely capitalized. A multi-word lexical unit, that is a member of a defining set, is connected with the underscore character.

ABSTRACT_NOUN
  Can be represented by a large set of lexical units that are abstract nouns, where only a small sample of such set is shown below:
  {density, accuracy, happiness, movement, hatred, . . . }
ACTION
  Can be represented by a set of lexical units that includes surface verbs ending in "-ing" (e.g., providing, removing, reducing) and the deverbal noun form of such verbs (e.g., provision, removal, reduction).
BADTHING
  Can be represented by the following set of lexical units that are surface nouns (all of which refer to something that has, to at least some degree, a connotation with the concept "Bad"):
  {cancer, catastrophe, failure, . . . }
GOOD
  Can be represented by the following set of lexical units that are surface adjectives (all of which refer to or implicate, to at least some degree, the concept "Good"):
  {good, adaptable, adequate, admirable, advantageous, beneficial, desirable, effective, efficient, excellent, favorable, helpful, perfect, positive, successful, suitable, superior, valuable, viable, reliable, . . . }
GOODTHING
  Can be represented by the following set of lexical units that are surface nouns (all of which refer to something that has, to at least some degree, a connotation with the concept "Good"):
  {goodness, admirability, magnificence, triumph, fortune, success, prosperity, advantage, benefit, enjoyment, joy, delight, pleasure, efficacy, safety, relief, efficiency, promotion, prize, stability, reward, productivity, virtue, integrity, popularity, rewards, merit, harvest, miracle, treasure, reliability, excellence, perfection, breakthrough, supremacy, masterpiece, refinement, jewel, adequacy, victory, favor, . . . }
HUMAN
  Can be represented by the following set of lexical units, where each member is a common noun or a person's proper name:
  {guy, lady, teacher, John, Mary, . . . }
IMPROVE
  Can be represented by the following set of lexical units that are logical verbs (all of which relate to increasing a level of goodness for a noun):
  {improve, improvement, rally, purify, purification, refresh, refreshen, benefit, optimize, perfect, upgrade, restore, better, refurbish, enrich, polish, remodel, furbish_up, lighten_up, . . . }
NON-BADTHING
  Can be represented by any lexical unit that is not a member of the set of lexical units representing BADTHING.
NON-HUMAN
  Can be represented by any lexical unit that is a noun and is not a member of the set of lexical units representing HUMAN.

6.3 Other Frames

The Benefit Frame has been focused-on herein. However, the techniques presented herein can be applied to other frames. Other example frames are: the Problem Frame and the Technology Frame.

6.3.1 Problem Frame

The Problem Frame can be viewed as a counterpart to the Benefit Frame. It captures the semantics of something "Bad" happening (see Glossary of Selected Terms for a definition of "Bad"). The roles of a Problem Frame, and their relation to the Benefit Frame, can be defined as follows:
  1) Adversary: Answers the question "who caused the problem?" Corresponds to Benefactor role of the Benefit Frame.
  2) Problem: The logical verb phrase that describes the bad action or behavior. Corresponds to Benefit role of the Benefit Frame.
  3) Victim: The entity who is negatively effected by the bad action. Corresponds to Beneficiary role of the Benefit Frame.
  4) Loss: The quality or metric that is negatively effected by the bad action. Corresponds to Gain role of the Benefit Frame.
  5) Method: The non-entity means that causes (at least in part) the bad action. Corresponds to the Instrument role of the Benefit Frame.

Unlike the Benefit Frame, which is naturally suited to technology scouting, the Problem Frame is more suitable to "market scouting" (i.e., the search for problems to which an already-known technology can be applied). A market scouting search can be accomplished in a similar manner to that described herein for technology scouting, except that the search query is utilized to search for instances of a Problem Frame rather than a Benefit Frame.

6.3.2 Technology Frame

The frame, referred to herein as the "Technology Frame," is particularly useful after a technology scouting search has already identified an existing technology "ET1" of interest. The Technology Frame is useful for helping a user evaluate an ET1. The following is an example set of 13 roles into which the concept of a "technology," that is the basis for the Technology Frame, can be decomposed:
  1) Technology: The value for the Technology role can be either a Benefactor or an Instrument from the Benefit Frame.
  2) Pioneer: The value for the Pioneer role describes an entity that has led the development or shows some expertise in the Technology. Typically the entity is an organization.
  3) Inventor: The value for the Inventor role describes an entity that has developed or contributed to the development of the Technology. Typically the entity is a person.
  4) Origin: The value for the Origin role describes a location where the Technology was first developed or is produced. The location can refer to a geographic place, nation (e.g., Japan) or nationality (e.g., "Japanese").
  5) Seller: The value of the Seller role describes an entity that sells the Technology. Typically the entity is a company.
  6) Provider: The value of the Provider role describes an entity that provides the Technology. Typically the entity is an organization that is not a company (when the entity is a company, the value is assigned to the Seller role instead).

7) User: The value of the User role describes an entity that uses the Technology. Typical entities can include an organization, person or location.

8) Product Based On: The value of the Products Based On role describes a product that is based on the Technology. A product can be a branded commercial product such as "TOYOTA PRIUS" or a product category such as "staplers".

9) Product in Category: The value of the Product In Category role describes a product that is in a particular product category represented by the Technology role. The value in the Technology role is sometimes a product category such as "staplers" as opposed to something more often considered to be a technology such as "WiFi". The Product In Category role can only be filled by a value when the Technology represents a product category.

10) Expert: The value of the Expert role describes a person who has been noted for their expertise in the Technology.

11) Pro: The value of the Pro role describes something good about the Technology. The Pro role can be implemented with the same rules as the Benefit, Gain, and Problem roles of the Benefit Frame. However, with the Technology Frame, a user searches on the Technology role in order to see the Pro role as output. In contrast, with the Benefit Frame, a user searches on the Benefit, Gain, or Problem role in order to see the roles corresponding to the Technology role in the Technology Frame, namely the Benefactor and Instrument roles.

12) Con: The value of the Con role describes something bad about the Technology. The Con role can be implemented with the same rules as can be used for the Victim, Loss and Problem roles of the above-described Problem Frame. With the Technology Frame, a user searches on the Technology role in order to the see the Con role as output.

13) Performance Metric: The value of the Performance Metric role describes any measurable attribute (or characteristic) of the technology or product.

Further discussion, of just the Performance Metric role, is as follows.

Consider the example of a digital camera, and all of the metrics by which its performance can be measured. If you read the product specification for a formally-released digital camera product, such as the CANON POWERSHOT A460, potential consumers will typically be provided with a table of the camera's specifications.

Such specifications are an example of what we are calling "Performance Metrics." For consumer products such Performance Metrics are often described in tabular form, but for emerging products and technologies the market can be too new for such structured data. In such cases, Performance Metrics tend to be expressed in natural language text. By making the present system able to recognize natural language descriptions of a technology or product's Performance Metrics, more structured specification descriptions, such as the tabular forms available for consumer products, can be automatically generated. A large portion of Internet-accessible content can be processed, in accordance with Technology Frame extraction rules, to convert unstructured text into structured product and/or technology specifications.

As an example, consider the following sentence: "I use a Canon Powershot G6 that has a maximum aperture of 2.0 on the wide end." Using a Technology Frame extraction rule, the following (partial) Technology Frame instance can be produced:
Technology: "Canon Powershot G6"
Performance Metric: "maximum aperture"

The types of values, that can be assigned to the Performance Metric role, can be divided into at least three sub-classes. The three sub-classes are: Quantified, Qualitative and Binary. For each sub-class there can be additional roles, not listed above for the Technology Frame, that can be assigned values. Below, for each sub-class, example Technology Frame instances are presented.

For the Quantified sub-class of Performance Metric values, consider the following sentence: "With Garmin's patented position-reporting capability, the Rino 520 packs 5 watts of transmit power for a range of up to 14 miles." Using Technology Frame extraction rules, the following (partial) Technology Frame instance can be produced:
Performance Metric: "transmit power"
Quantitative Value: "5"
Unit of Measure: "watts"

As can be seen, the above-listed frame instance includes two roles that are additional to the Performance Metric role: Quantitative Value and Unit of Measure.

As another example of the Quantified sub-class of Performance Metric values, consider the following sentence: "I use a Canon Powershot G6 that has a maximum aperture of 2.0 on the wide end." Using Technology Frame extraction rules, the following (partial) Technology Frame instance can be produced:
Performance Metric: "maximum aperture"
Quantitative Value: "2.0"
Unit of Measure: <unspecified>

For the Qualitative sub-class of Performance Metric values, consider the following sentence: "Consequently such catalytic reactors can provide a high power density." Using Technology Frame extraction rules, the following (partial) Technology Frame instance can be produced:
Performance Metric: "power density"
Qualitative Value: "high"

For the Binary sub-class of Performance Metric values, consider the following sentence: "The PowerShot G2 is equipped with the RAW mode, which stores image data as captured without any signal processing." Using Technology Frame extraction rules, the following (partial) Technology Frame instance can be produced:
Performance Metric: "RAW mode"
Has It: "yes"

The example "Has It" role is of type Binary because it can take either of two values: "yes" or "no."

6.4 Production Environment

FIG. 13 depicts an example computer system design in which the techniques described herein can be applied.

Cloud 1330 represents data available via the Internet. Computer 1310 can execute a web crawling program, such as Heritrix, that finds appropriate web pages and collects them in an input database 1300. An alternative, or additional, route for collecting input database 1300 is to use user-supplied data 1331. For example, such user-supplied data 1331 can include the following: any non-volatile media (e.g., a hard drive, CD-ROM or DVD), record-oriented databases (relational or otherwise), an Intranet or a document repository. A computer 1311 can be used to process (e.g., reformat) such user-supplied data 1331 for input database 1300.

Computer 1312 can perform the indexing phase needed for formation of an appropriate FBDB (described in section 4.1.3 "Third Approach"). The indexing phase scans the input database for sentences that refer to an organizing frame, produces a snippet around each such sentence and adds the snippet to the appropriate frame-based database. FIG. 13 depicts an example frame-based database 1301. In a system designed for technology-scouting searching, at least one such FBDB could be produced: one with the Benefit Frame as the organizing frame.

Databases 1320 and 1321 represent, respectively, stable "snapshots" of databases 1300 and 1301. Databases 1320 and 1321 can provide stable databases that are available to service search queries entered by a user at a user computer 1333. Such user query can travel over the Internet (indicated by cloud 1332) to a web interfacing computer 1314 that can also run a firewall program. Computer 1313 can receive the user query and perform the search phase (described in section 4.1.3 "Third Approach") upon the contents of FBDB 1321. Computer 1313 can also perform a frame-based analysis of the search results. The search results can be stored in a database 1302 that is private to the individual user. When a snippet of interest is found in the search results, input database 1320 is available to the user to provide the full document from which the snippet was obtained.

6.5 Other Environments

In addition to the Production Environment discussed above in section 6.4, the techniques of the present invention can also be applied to the data that is present on a single-user computer system.

Further, in the context of a user considering an individual document (where such user can be working on a single-user computer or in a larger computing environment), such individual document can be searched and/or analyzed with the techniques of the present invention.

7 Glossary of Selected Terms

Abstract noun: a noun that does not refer to any specific physical object. Typically, an abstract noun describes a quality of something (e.g., density, beauty) or it is a deverbal noun.

"Bad": used herein to refer to the concept "Bad." The concept "Bad" occurs, in a UNLD (typically, a single sentence), when that unit refers to, with regard to something, a negative, detriment or badness that is of, or related to, that something.

Common noun: a noun that is a member of the following set of nouns: the set of all nouns, minus the set of all proper names.

Computer-accessible content: any type of content that is accessible via computer. This includes database content as well as streaming sources of data.

Database: any corpus of data that is accessible by computer.

Deverbal noun: a surface noun that is derived from a surface verb. Some examples are as follows. The surface verb "enhance" can be converted into the deverbal noun "enhancement." The surface verb "work" (as in the example sentence "John works hard") can be converted into the deverbal noun "hard work" (as in the example sentence "John got good results by hard work").

Document repository: a collection of documents that pertains to a particular subject, topic or domain. A document repository can include unstructured data and/or data that is in a variety of formats. A document repository is often created to archive information for long-term retention and/or historical purposes.

"Good": used herein to refer to the concept "Good." The concept "Good" occurs when a UNLD (typically, a single sentence) refers to, with regard to something, a positive, benefit or goodness that is of, or related to, that something.

Internet-accessible content: any type of content that is accessible via the Internet. This includes web pages, documents, database content and streaming data sources.

Internet-accessible location: an address or other identifier by which Internet-accessible content can be accessed.

Intranet: any computer network that is private to a particular company or other form of organization. Access to an Intranet can be granted to third parties who are not part of the company or organization. Such third parties can include customers, suppliers, consultants and contractors.

Keyword-based search: The process by which a UNLD of interest can be identified within a larger database based on the presence or absence of pre-selected query terms within that UNLD. In the simplest implementation, the query is an exact word or phrase. One elaboration allows for each query to be a pattern that specifies a set of possible matching words or phrases. One common manner of elaboration is to allow a word to be substituted by any of its grammatical forms (e.g., "written," "writes," and "wrote" all matching a query of "write"). Another common manner of elaboration is to allow expressions of queries linked together with the operators of standard or nonstandard logics, where the expression is deemed to be present if each internal term is interpreted as a subquery, and the expression, applied to those subqueries evaluates to true.

Lexical unit: A sequence of one or more words that has at least one meaning "m" for which the sequence operates as an indivisible unit. In the case of a multi-word lexical unit, its meaning "m" cannot be derived from any normal composition of the meanings of the lexical unit's constituent words. For example, "The White House" is not simply any house which happens to be white, and "dry ice" is not simply ice that happens to be dry.

Logical verb: An action word that, typically, corresponds to either a surface verb or a deverbal noun.

Proper name: a capitalized lexical unit that refers to a particular individual. The kinds of particular individuals, referred-to by a proper name, can include the following: a person, an organization or a location.

Record: Any representation of data that is recognized, for the database of interest, as a discretely accessible unit.

Snippet: a package of text that surrounds the location of a match of a query to computer-accessible content (in the case of an FBDB, it is the location where the organizing frame matches). The snippet can be chosen to be of a sufficient size such that, on a statistical basis, it provides sufficient factual context for a user to understand whether the match is relevant to his or her search topic.

"Surface," as applied to a part of speech (e.g., a "surface noun" or "surface verb") or a grammar constituent (such as "surface subject"): indicates a linguistic unit that has been analyzed a lesser amount than is needed to produce a Logical Form representation. The level of representation, produced by this lesser amount of analysis, is referred to (in the field of natural language processing) as the "syntactic level." In contrast, the level of representation, produced for the Logical Form, is also referred to (in the field of natural language processing) as the "deep logical" or "semantic" level.

UNLD: Refers to a "unit of natural language discourse unit." The term "UNLD" can be used to refer to any unit of a natural language discourse. For example, a UNLD can refer to a unit that is of arbitrary length or that is not associated with any general linguistic structure. However, the UNLD focused-upon herein is the single sentence.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for frame-based search to identify content of interest, comprising the following steps:

determining, as a result of computing hardware and programmable memory, a set of logical forms, each logical form representative of a unit of natural language discourse in a first source of computer-accessible content, wherein at least some logical forms, of the set of logical forms, are arranged as a tree, at least some trees including a predicate root, a logical subject, and a logical object;

determining, for each logical form of the set of logical forms, as a result of computing hardware and programmable memory, whether a first frame extraction rule is satisfied by a logical form and, if a frame extraction rule is satisfied, producing a first instance of a first frame;

determining, for each unit of natural language discourse that invokes the first frame, as a result of computing hardware and programmable memory, a locality that includes the unit of natural language discourse;

including, as a result of computing hardware and programmable memory, each locality as a record of a first database; and searching, as a result of computing hardware and programmable memory, the first database, to identify a first set of records, by identifying those records that contain at least one match to a first keyword query.

2. The method of claim 1, further comprising the following:

determining, as a result of computing hardware and programmable memory, the first frame extraction rule, requiring a predicate root, a logical subject, and a logical object, is satisfied by a first logical form from the set of logical forms.

3. The method of claim 2, wherein the predicate root of the first frame extraction rule requires an adjective in the first logical form.

4. A method for frame-based search to identify content of interest, comprising the following steps:

determining, as a result of computing hardware and programmable memory, a set of logical forms, each logical form representative of a unit of natural language discourse in a first source of computer-accessible content, wherein at least some logical forms, of the set of logical forms, are arranged as a tree, at least some trees including a cause-effect pattern, where either an effect node is parent to a cause node or a cause node is parent to an effect node;

determining, for each logical form of the set of logical forms, as a result of computing hardware and programmable memory, whether a first frame extraction rule is satisfied by a logical form and, if a frame extraction rule is satisfied, producing a first instance of a first frame;

determining, for each unit of natural language discourse that invokes the first frame, as a result of computing hardware and programmable memory, a locality that includes the unit of natural language discourse;

including, as a result of computing hardware and programmable memory, each locality as a record of a first database; and searching, as a result of computing hardware and programmable memory, the first database, to identify a first set of records, by identifying those records that contain at least one match to a first keyword query.

5. The method of claim 4, further comprising the following:

determining, as a result of computing hardware and programmable memory, the first frame extraction rule, requiring a cause-effect pattern, is satisfied by a first logical form from the set of logical forms.

6. The method of claim 5, wherein the cause-effect pattern of the first frame extraction rule requires, in the first logical form, an effect node as parent to a cause node.

7. The method of claim 5, wherein the cause-effect pattern of the first frame extraction rule requires, in the first logical form, a cause node as parent to an effect node.

8. A method for frame-based search to identify content of interest, comprising the following steps:

determining, as a result of computing hardware and programmable memory, a set of logical forms, each logical form representative of a unit of natural language discourse in a first source of computer-accessible content, wherein at least some logical forms, of the set of logical forms, are arranged as a tree, at least some trees including a surface verb root, a logical subject, and a logical object;

determining, for each logical form of the set of logical forms, as a result of computing hardware and programmable memory, whether a first frame extraction rule is satisfied by a logical form and, if a frame extraction rule is satisfied, producing a first instance of a first frame;

determining, for each unit of natural language discourse that invokes the first frame, as a result of computing hardware and programmable memory, a locality that includes the unit of natural language discourse;

including, as a result of computing hardware and programmable memory, each locality as a record of a first database; and searching, as a result of computing hardware and programmable memory, the first database, to identify a first set of records, by identifying those records that contain at least one match to a first keyword query.

9. The method of claim 8, further comprising the following:

determining, as a result of computing hardware and programmable memory, the first frame extraction rule, requiring a surface verb root, a logical subject, and a logical object, is satisfied by a first logical form from the set of logical forms.

* * * * *